(12) United States Patent
Roy et al.

(10) Patent No.: US 11,062,711 B2
(45) Date of Patent: *Jul. 13, 2021

(54) VOICE-CONTROLLED COMMUNICATION REQUESTS AND RESPONSES

(71) Applicant: Amazon Technologies, Inc., Seattle, WA (US)

(72) Inventors: Tapas Kanti Roy, Cupertino, CA (US); Brian Oliver, Seattle, WA (US); Christo Frank Devaraj, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/693,784

(22) Filed: Nov. 25, 2019

(65) Prior Publication Data

US 2020/0135208 A1 Apr. 30, 2020

Related U.S. Application Data

(63) Continuation of application No. 15/193,874, filed on Jun. 27, 2016, now Pat. No. 10,504,520.

(51) Int. Cl.
*H04M 3/00* (2006.01)
*G10L 15/30* (2013.01)
(Continued)

(52) U.S. Cl.
CPC .............. *G10L 15/30* (2013.01); *G10L 17/22* (2013.01); *G10L 2015/223* (2013.01); *G10L 2015/225* (2013.01); *H04M 3/00* (2013.01)

(58) Field of Classification Search
CPC ....................................................... H04M 3/00
See application file for complete search history.

(56) References Cited

U.S. PATENT DOCUMENTS

| 2005/0149319 A1* | 7/2005 | Honda | G10L 15/075 704/9 |
| 2008/0144788 A1* | 6/2008 | You | H04L 12/66 379/93.15 |

(Continued)

*Primary Examiner* — Feng-Tzer Tzeng
(74) *Attorney, Agent, or Firm* — Pierce Atwood LLP

(57) ABSTRACT

Systems and methods for establishing communication connections using speech, such as establishing calls between speech-controlled devices, are described. A first speech-controlled device receives a communication request in the form of audio and sends audio data corresponding to the captured audio to a server. The server performs speech processing on the audio data to determine a recipient, a subject for the call, and a device associated with the recipient. The server then sends a message indicating the communication request and audio data corresponding to the communication topic to the recipient's speech-controlled device. The recipient device outputs audio to the recipient requesting whether the recipient accepts the communication request. The recipient audibly refuses or accepts the communication request, and the recipient's speech-controlled device sends an indication of the recipient's audible decision to the server. If the recipient accepted the communication request, the server causes a communication connection be established between the two speech-controlled devices.

20 Claims, 24 Drawing Sheets

(51) Int. Cl.
*G10L 17/22* (2013.01)
*G10L 15/22* (2006.01)

(56) References Cited

U.S. PATENT DOCUMENTS

2009/0079622 A1* 3/2009 Seshadri ................ G01S 19/05
 342/357.42
2012/0239451 A1* 9/2012 Caligor ................ G06Q 10/00
 705/7.21

* cited by examiner

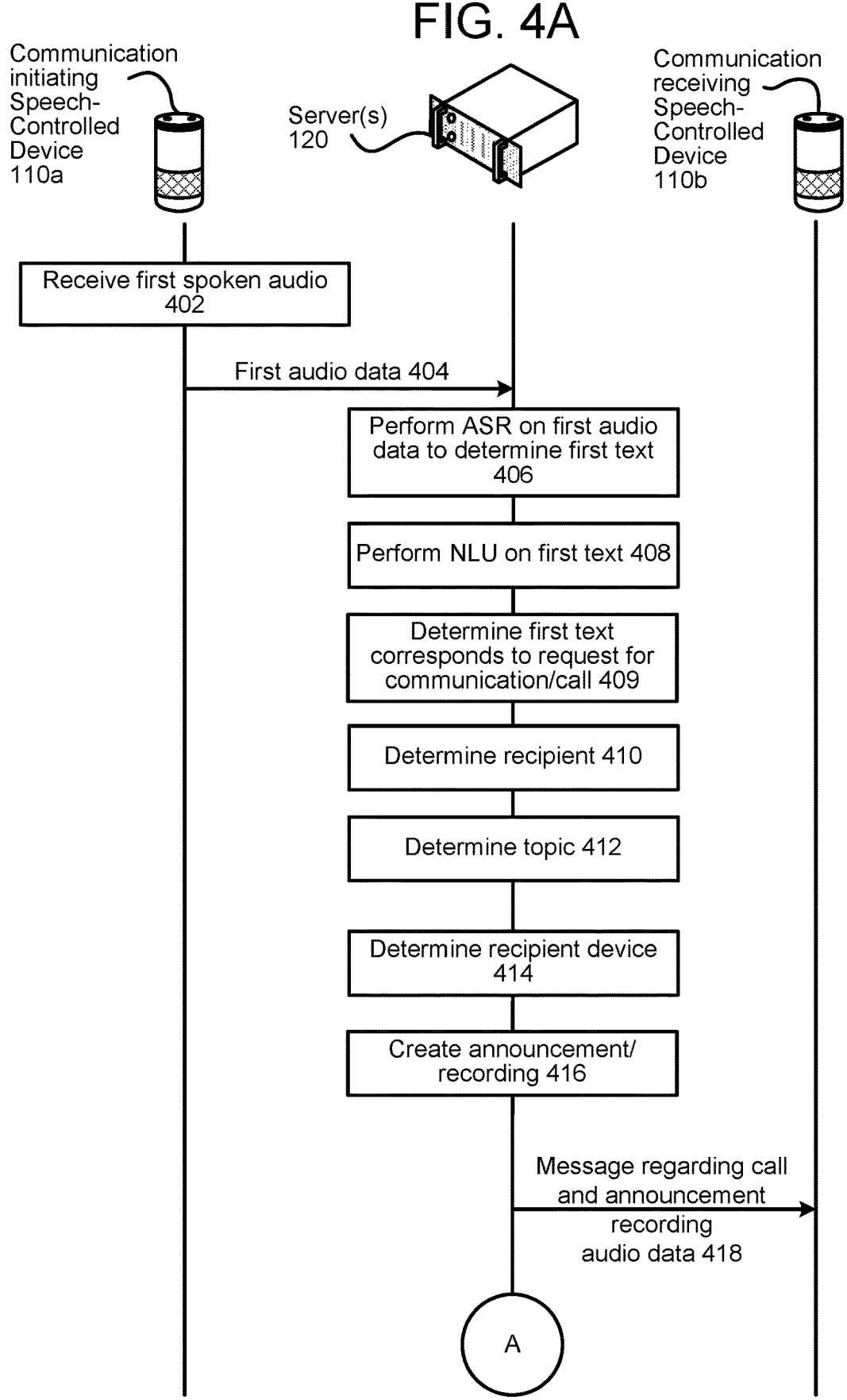

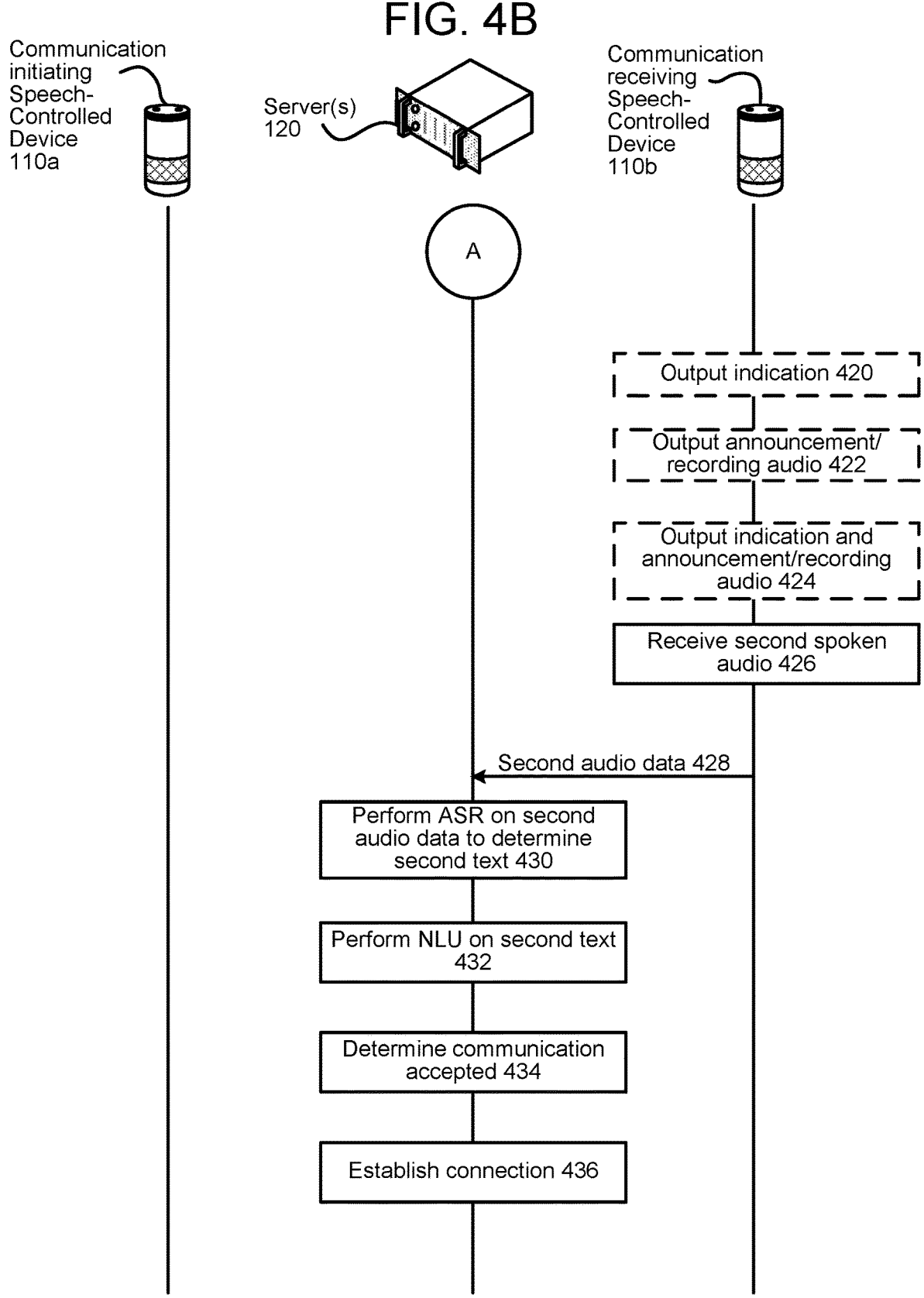

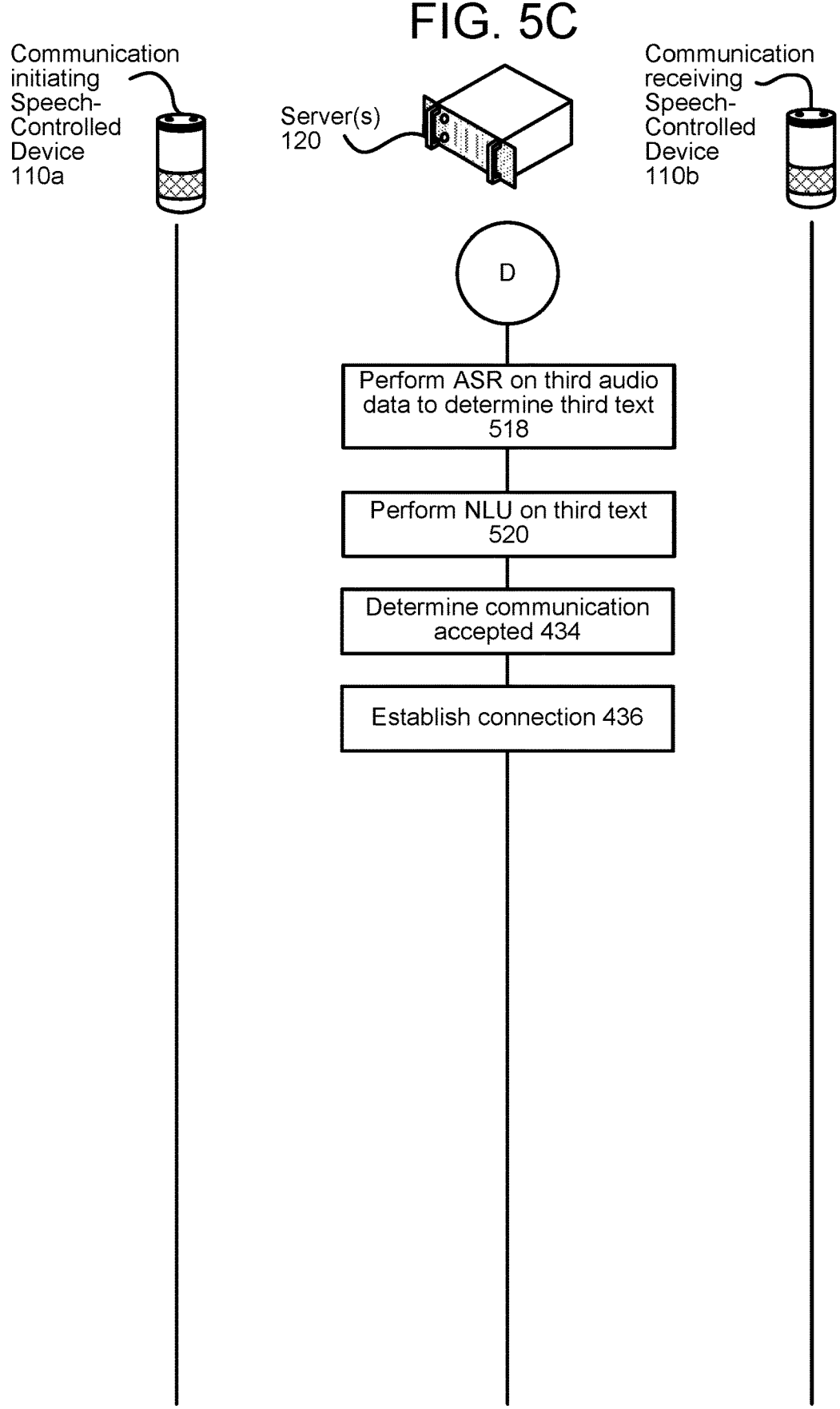

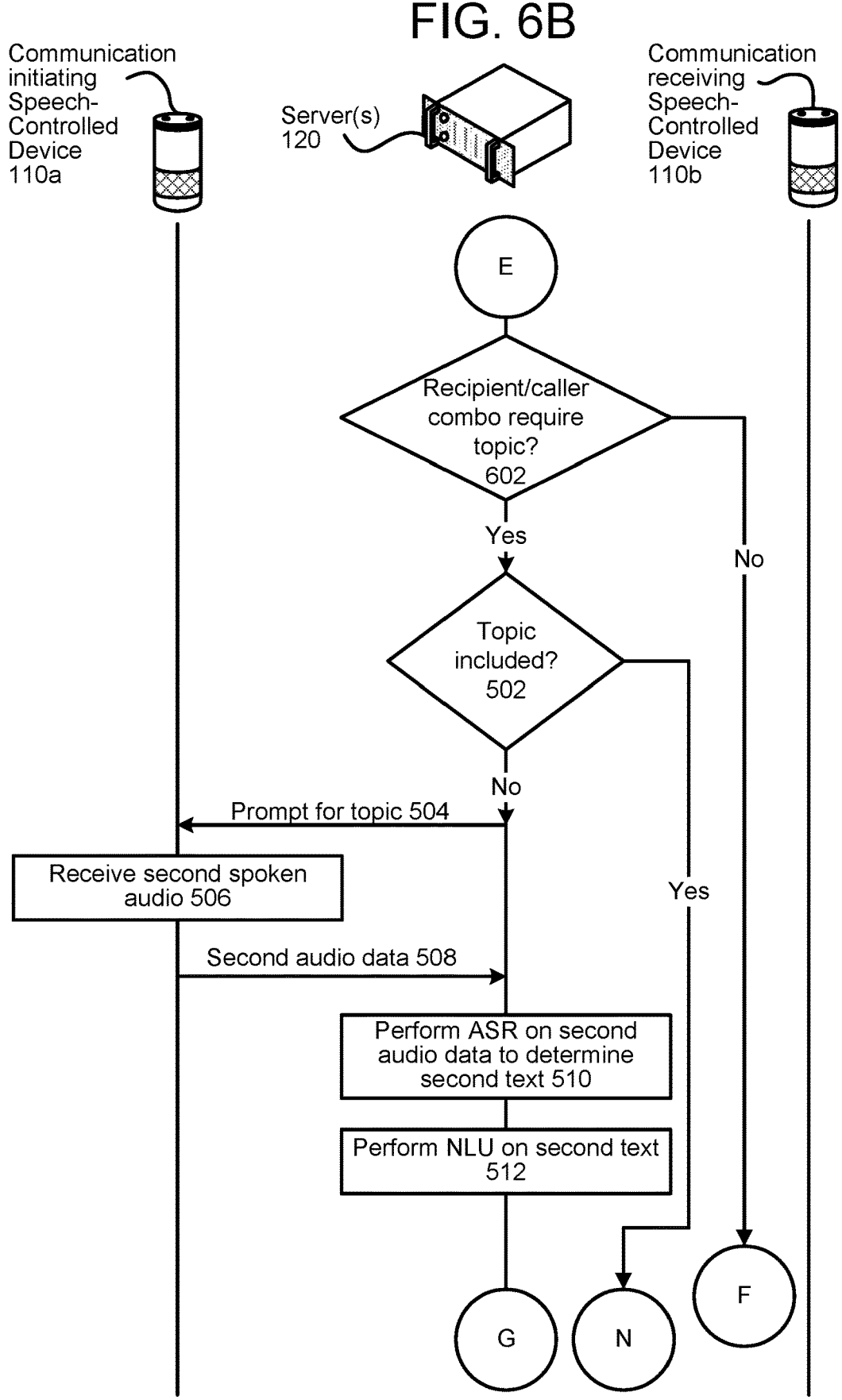

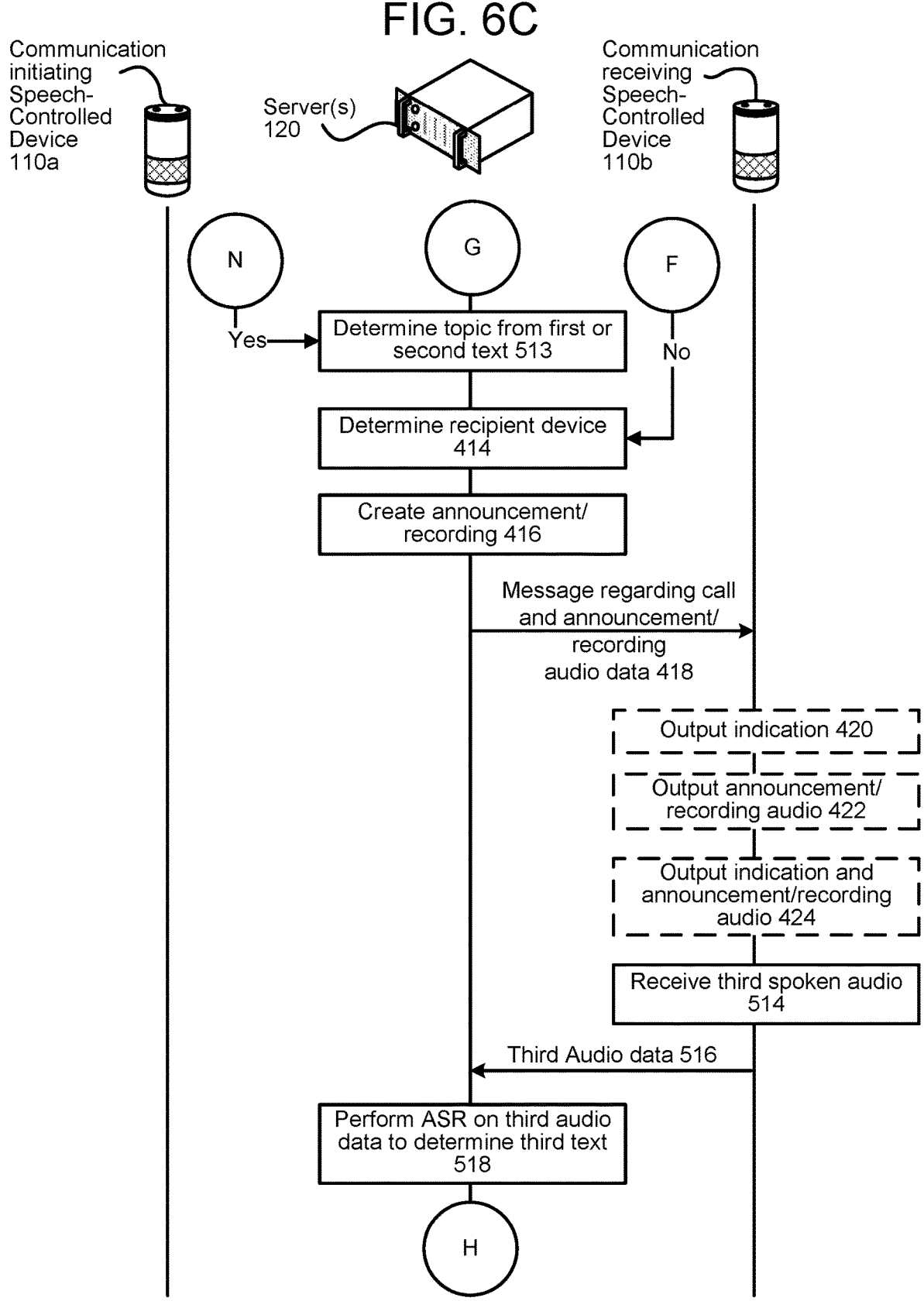

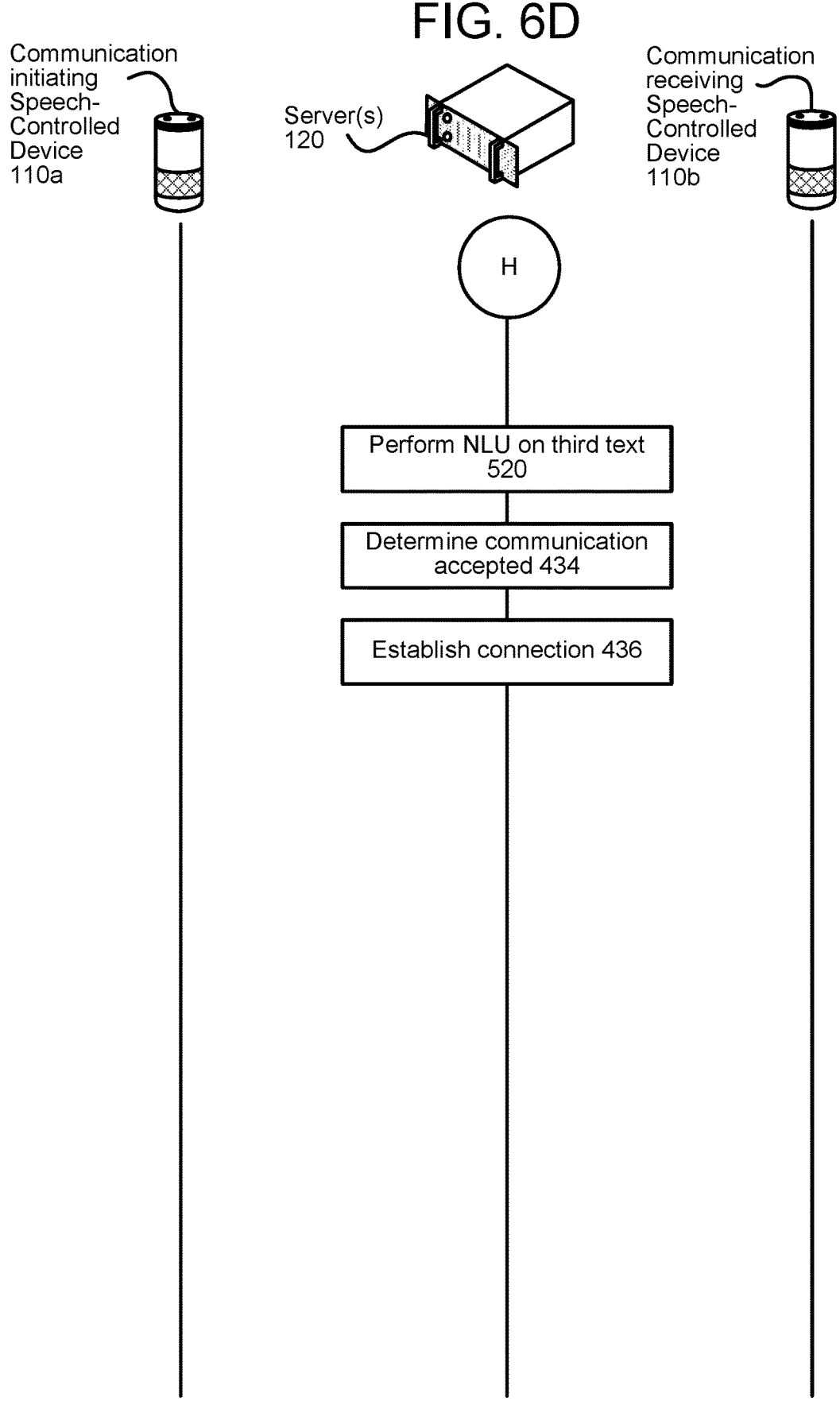

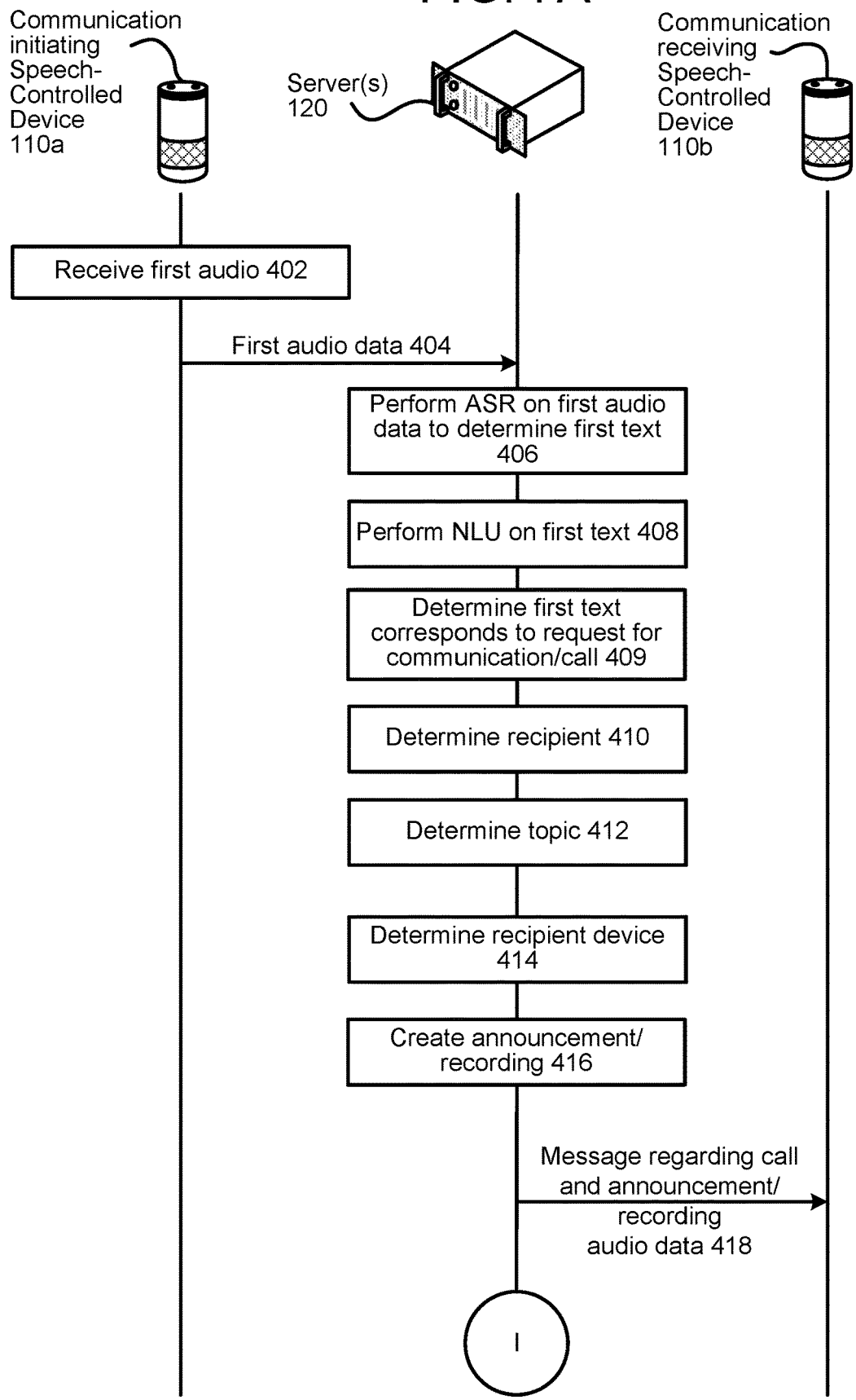

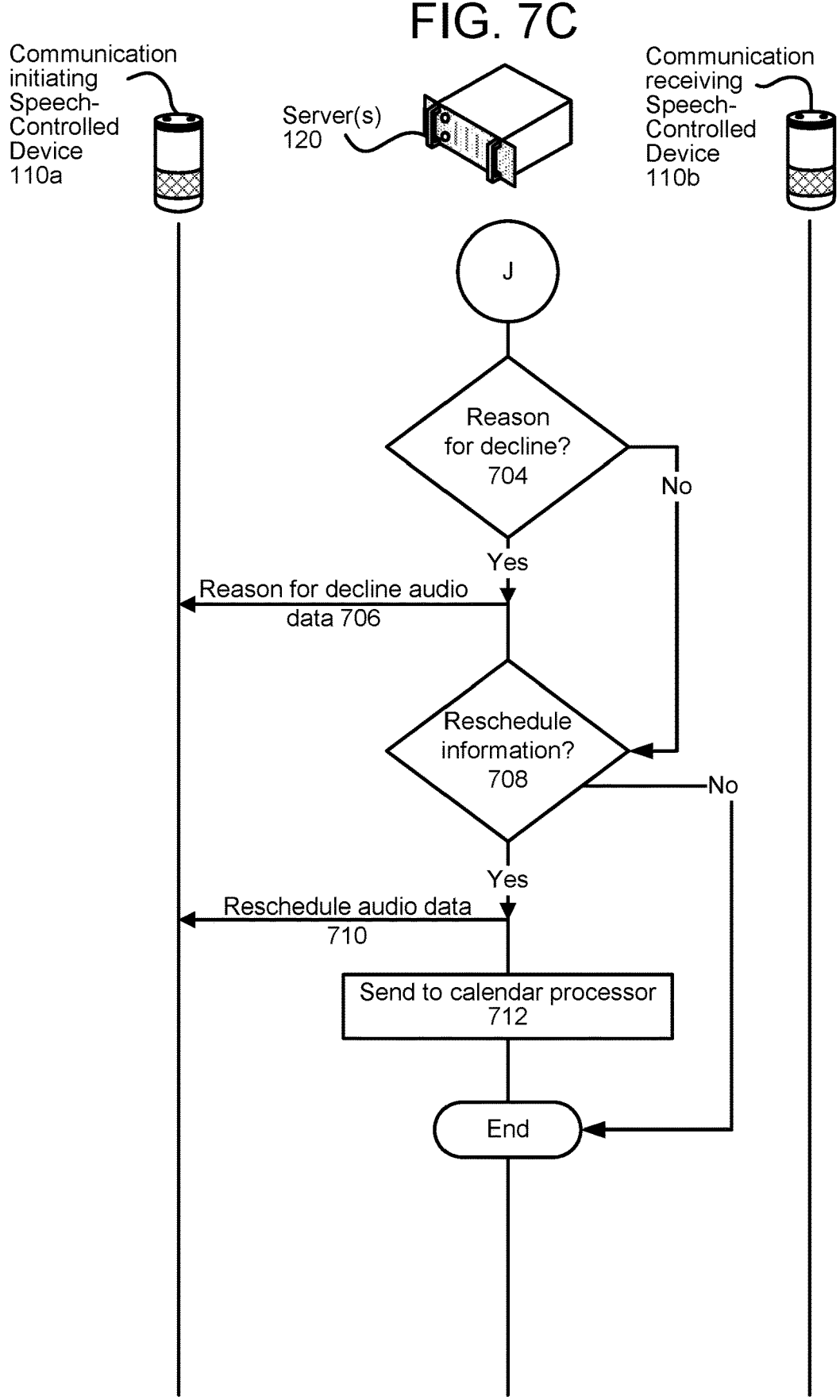

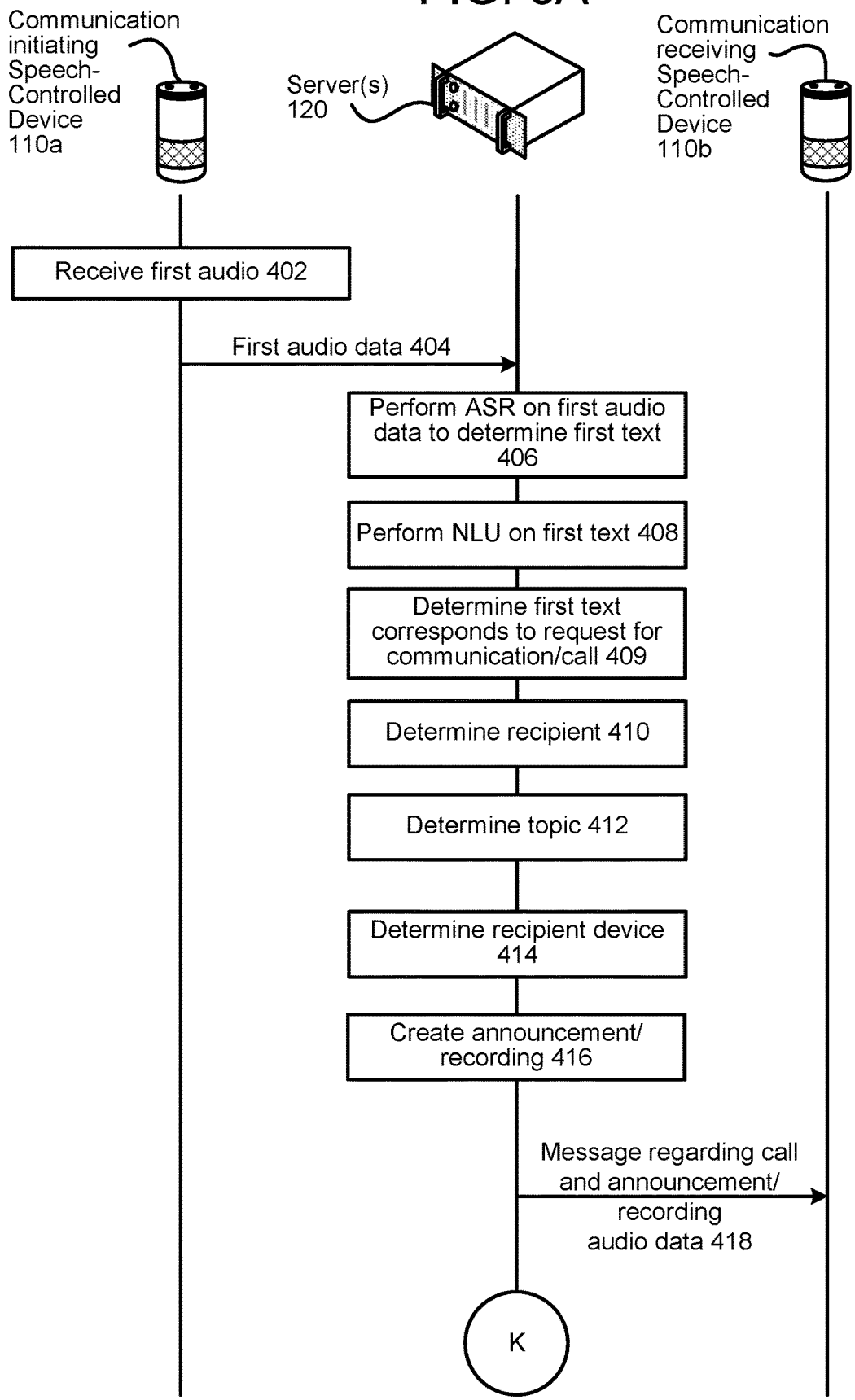

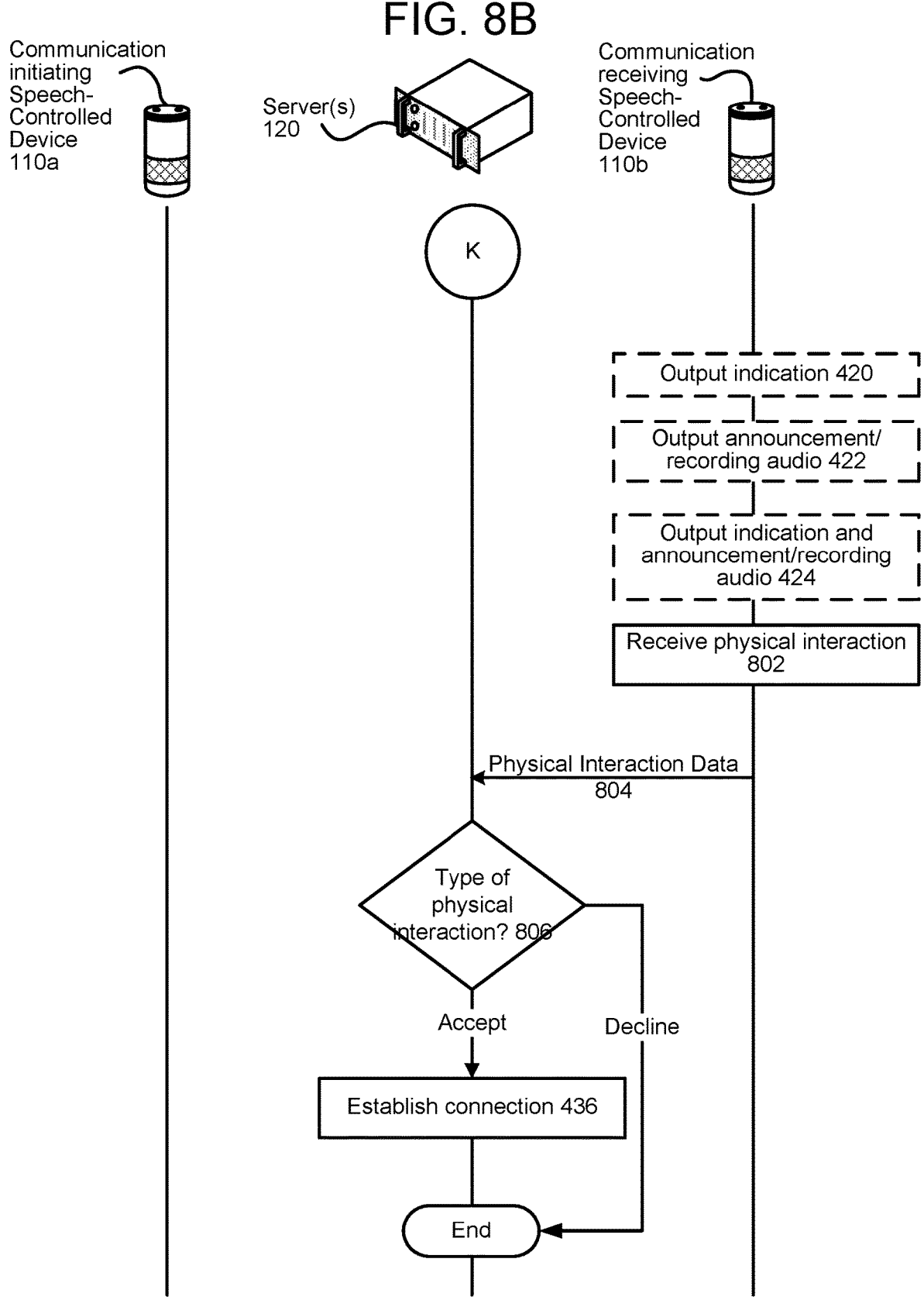

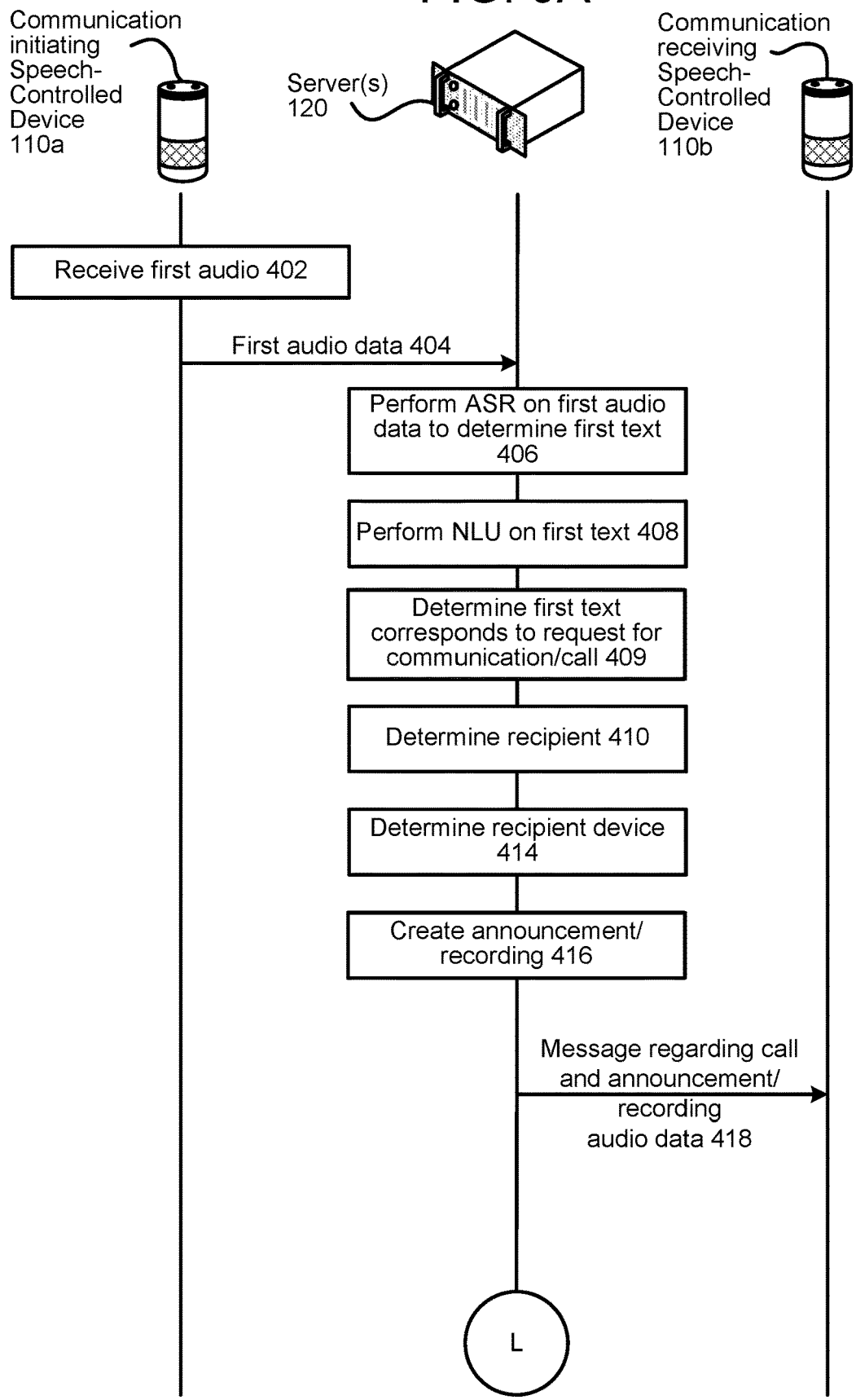

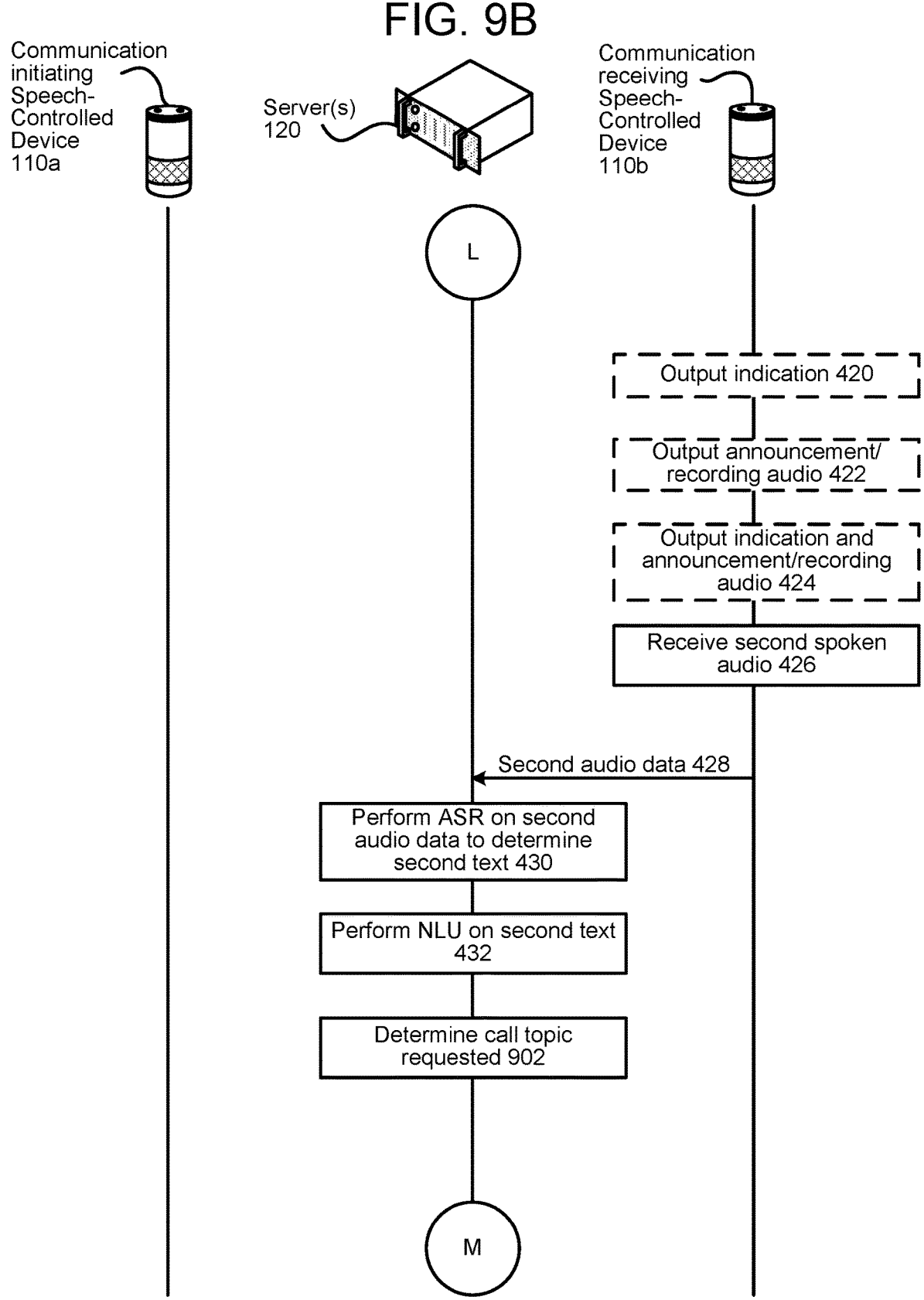

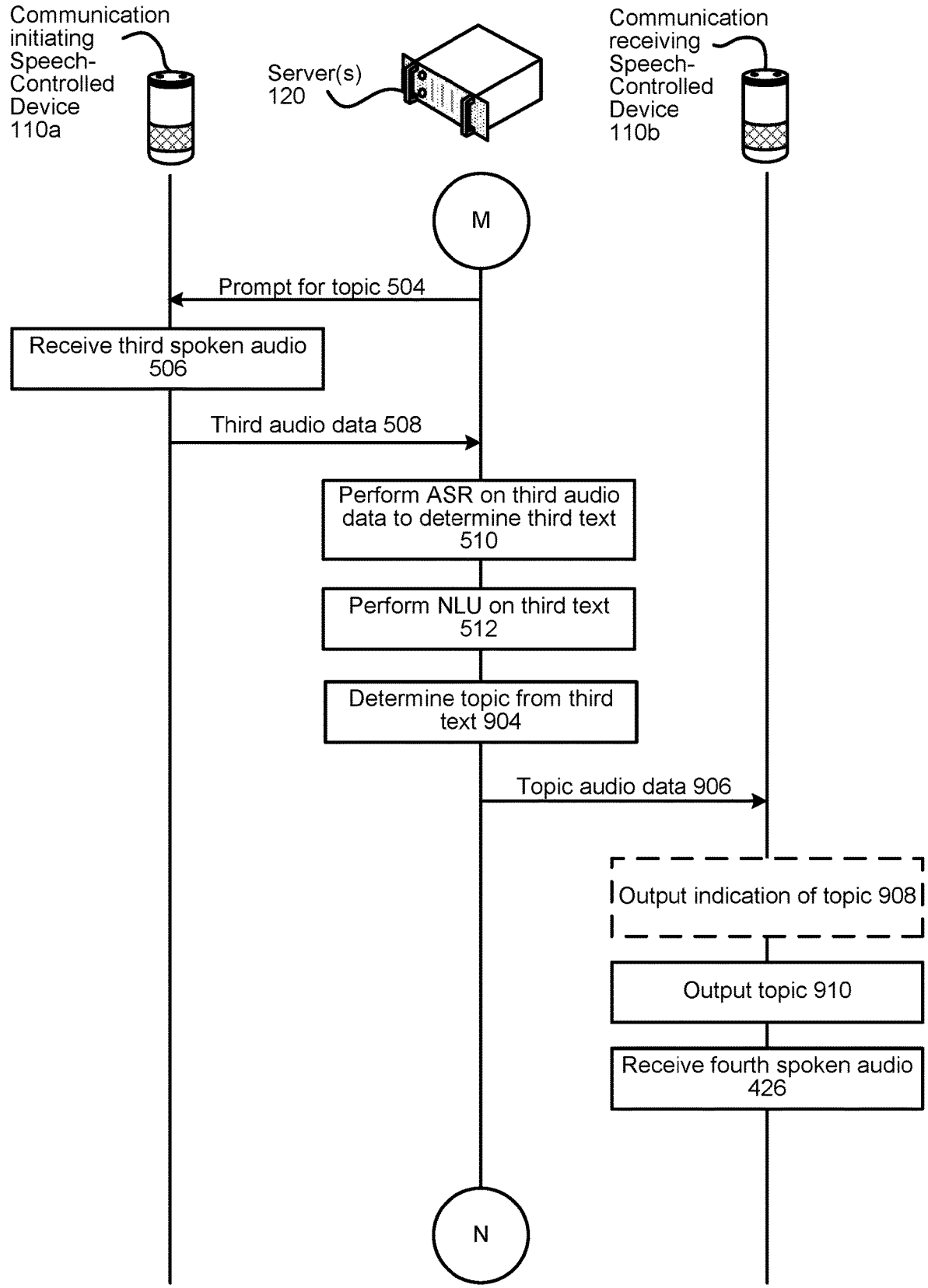

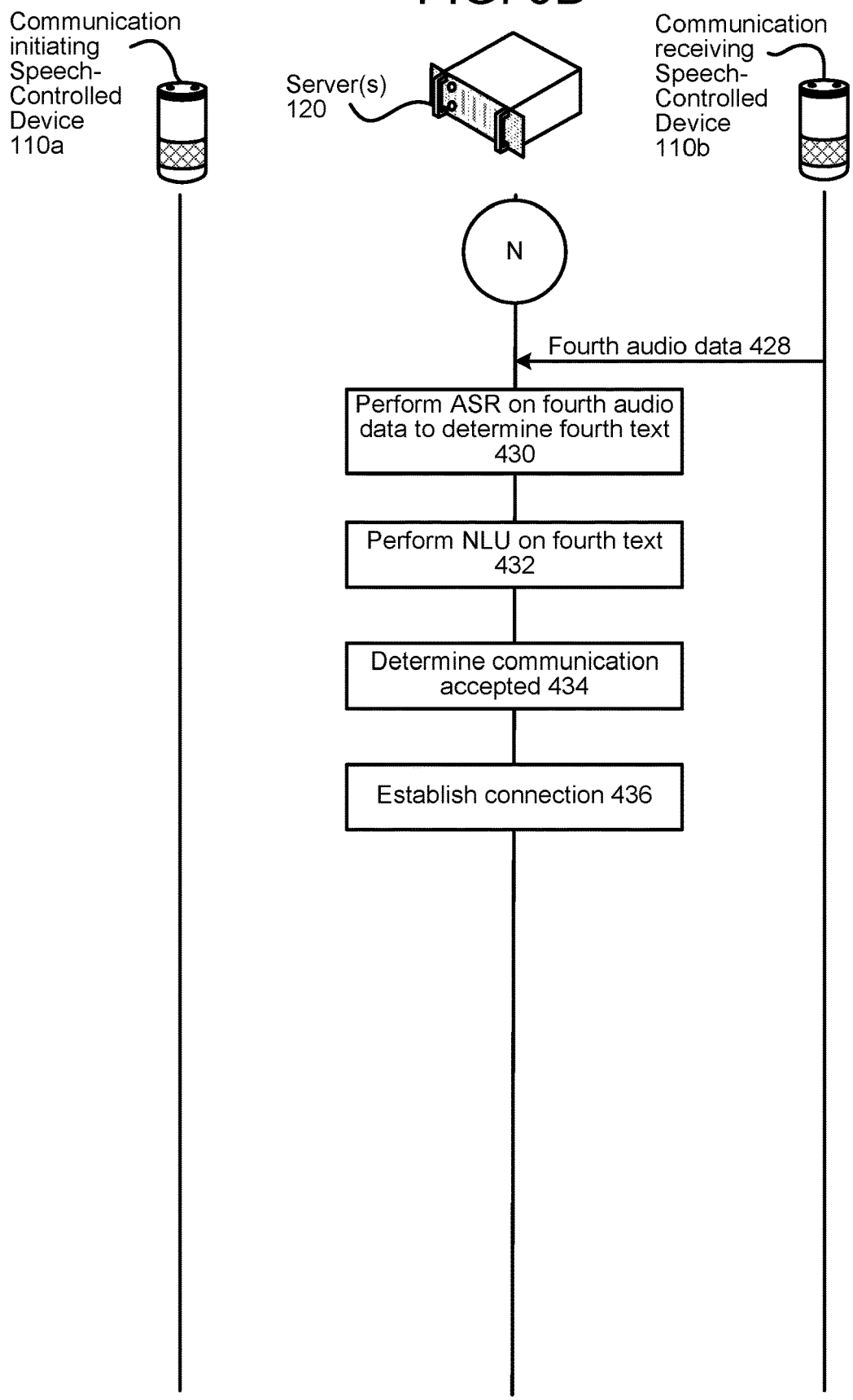

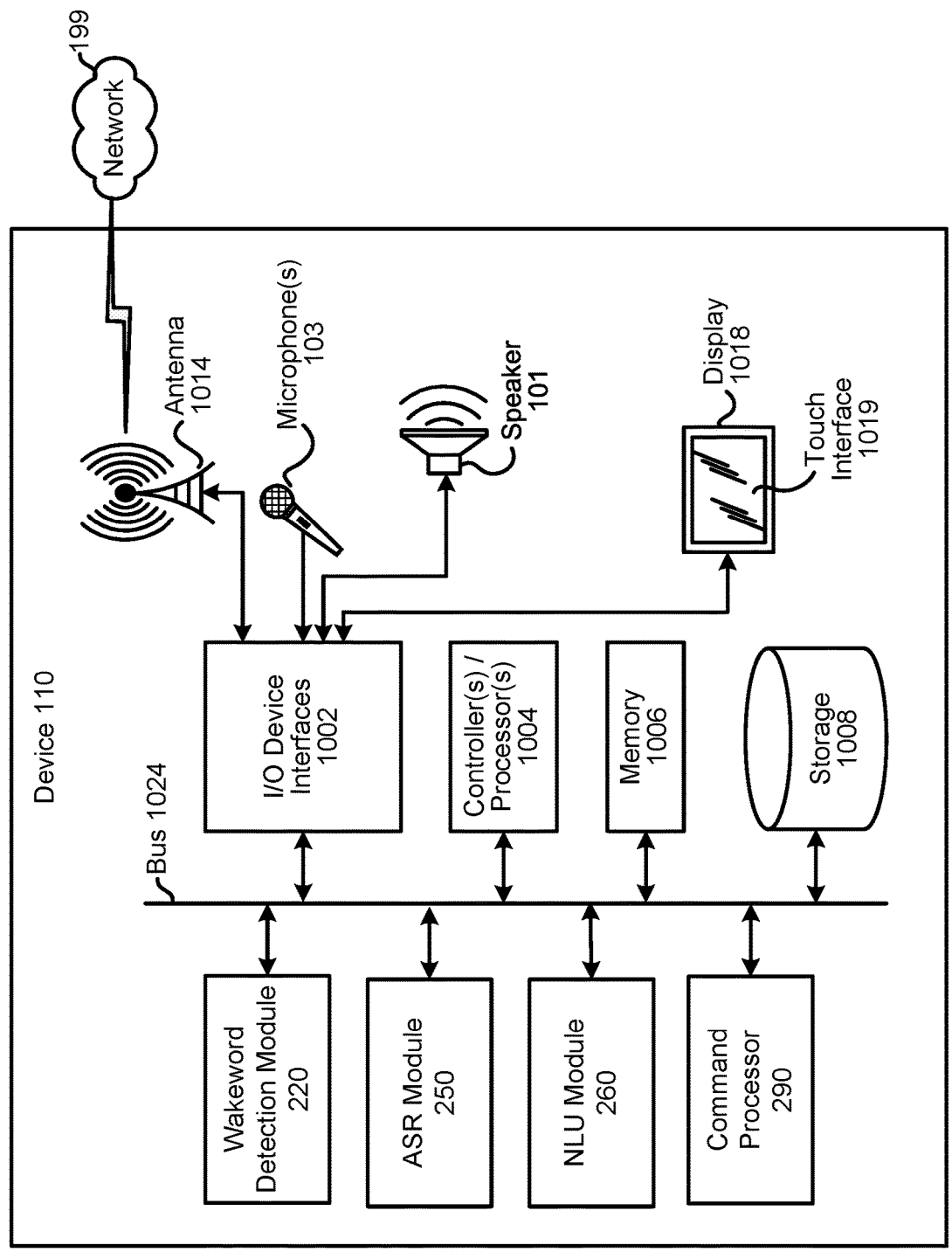

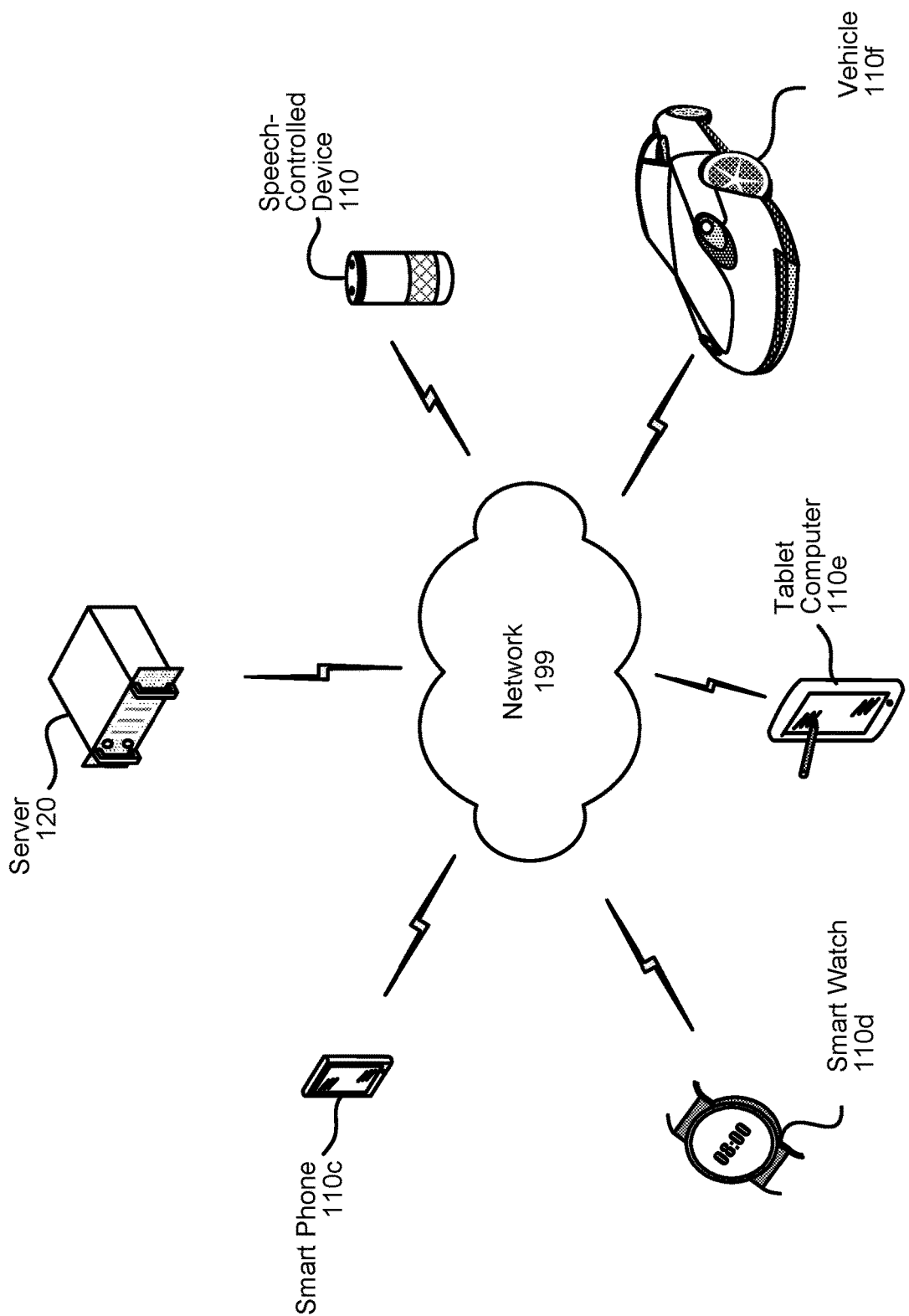

VOICE-CONTROLLED COMMUNICATION REQUESTS AND RESPONSES

CROSS-REFERENCE TO RELATED APPLICATION

This application is a continuation of, and claims the benefit of priority of, U.S. Non-provisional patent application Ser. No. 15/193,874, filed Jun. 27, 2016, and entitled "VOICE-CONTROLLED COMMUNICATION REQUESTS AND RESPONSES" and scheduled to issue as U.S. Pat. No. 10,504,520, the contents of which are expressly incorporated herein by referenced in its entirety.

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A and 4B are a signal flow diagram illustrating a communication request and the establishment of a communication between speech-controlled devices.

FIGS. 5A through 5C are a signal flow diagram illustrating a communication request and the establishment of a communication between speech-controlled devices.

FIGS. 6A through 6D are a signal flow diagram illustrating a communication request and the establishment of a communication between speech-controlled devices.

FIGS. 7A through 7C are a signal flow diagram illustrating a communication request and the refusal of a communication between speech-controlled devices.

FIGS. 8A and 8B are a signal flow diagram illustrating a communication request and the establishment and/or refusal of a communication between speech-controlled devices.

FIGS. 9A through 9D are a signal flow diagram illustrating a communication request and the subsequent request for a communication topic between speech-controlled devices.

FIG. 10 is a block diagram conceptually illustrating example components of speech-controlled devices according to embodiments of the present disclosure.

FIG. 12 illustrates an example of a computer network for use with the system.

DETAILED DESCRIPTION

Figure 1:
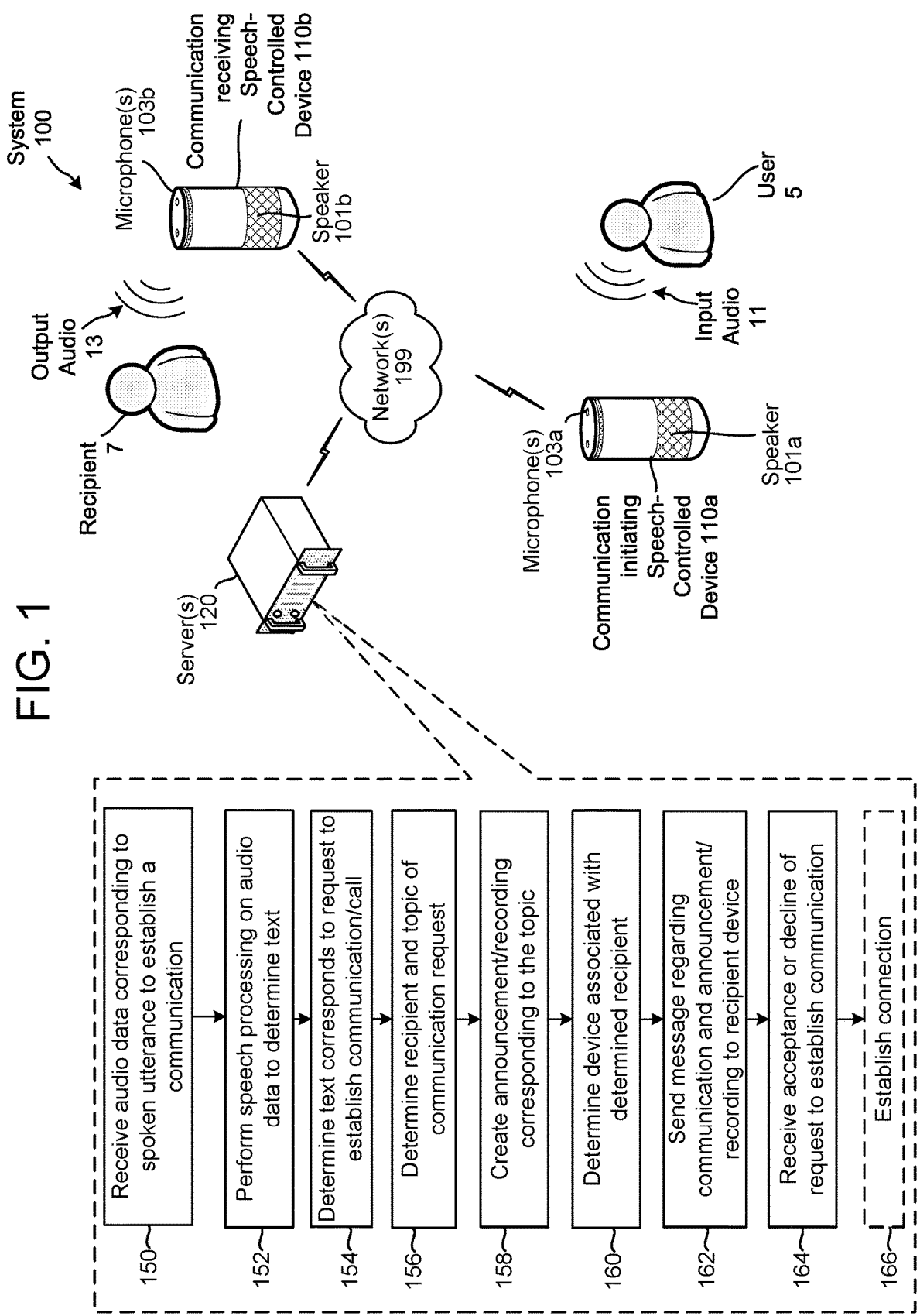
FIG. 1 illustrates a system for establishing a communication connection between speech-controlled devices in an automatic speech recognition (ASR) system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

Routinely, telephones and computers have been used to allow individuals to communicate either audibly and/or visually. With computing devices becoming more complex and sophisticated, traditional methods of establishing telephone calls or other communications are becoming irrelevant. Further, traditional techniques for establishing communications are not configured for use with speech-controlled devices.

The present disclosure provides techniques for establishing communications between speech-controlled devices, or other input-limited devices. For example, a caller may audibly indicate to a speech-controlled device that the caller desires to communicate with a particular recipient. Backend processing (for example, processing performed by a server that is located remote from a user device) as described herein may then be performed, resulting in the recipient's speech-controlled device visually and/or audibly conveying an indication(s) of the call. The indication of the call may also include some information about the subject matter of the call, reason for the call, or other "description" of the call. Such information may be provided by the caller to the system as part of a voice interaction and captured and processed by the system to then provide the information to the recipient prior to the recipient determining whether to accept or decline the call. Thus, the system may be configured to "preview" the call to the recipient prior to establishing a connection between the caller device and the recipient device. The recipient may either accept or decline the call by audibly and/or physically interacting with the recipient speech-controlled device. If the recipient accepts the call, a server in communication with both the caller and recipient speech-controlled devices causes a connection to be established, which allows the caller and recipient to communicate directly via the speech-controlled devices.

FIG. 1 shows a system 100 configured to establish a communication (e.g., a telephone call, video call, etc.) between speech-controlled devices. Although FIG. 1, and lower figures/discussion, illustrate the operation of the system 100 in a particular order, the steps described may be performed in a different order (as well as certain steps removed or added) without departing from the intent of the disclosure. As shown in FIG. 1, the system 100 may include one or more speech-controlled devices 110a and 110b local to a user 5 and a recipient 7, respectively. While the disclosure herein specifically mentions the use of speech-controlled devices, it should be appreciated that other devices (e.g., telephones, etc.) may be used without departing from the present disclosure. For example, if non-speech-controlled devices are used, the server of the present disclosure may be associated with a phone number and act as an automated answering service when an incoming call number is unrecognized (e.g., not in a contact/approved list) or is recognized. The system 100 also includes one or more networks 199 and one or more servers 120 connected to the devices 110a and 110b across network(s) 199. The server(s) 120 (which may be one or more different physical devices) may be capable of performing traditional speech processing (such as ASR, NLU, query parsing, etc.) as described herein. A single server may be capable of performing all speech processing or multiple servers may combine to perform the speech processing. Further, the server(s) 120 may be configured to execute certain commands, such as answering queries spoken by the user 10 and/or recipient 7. In addition, certain speech detection or command execution functions may be performed by the devices 110a and 110b.

As shown in FIG. 1, the user 5 may speak an utterance (represented by input audio 11) corresponding to an intent to establish a communication (e.g., a telephone call, video call, etc.) with a recipient 7. For example, the user 5 may say "Call John about tomorrow's party". The input audio 11 may be captured by one or more microphones 103a of the device 110a and/or a microphone array (not illustrated) separated from the device 110a. The microphone array may be connected to the device 110a such that when the input audio 11 is received by the microphone array, the microphone array sends audio data corresponding to the input audio 11 to the device 110a. Alternatively, the microphone array may be connected to a companion application of a mobile computing device (not illustrated), such as a smart phone, tablet, etc. In this example, when the microphone array captures the input audio 11, the microphone array sends audio data corresponding to the input audio 11 to the companion application, which forwards the audio data to the device 110a. If the device 110a captures the input audio 11, the device 110a may convert the input audio 11 into audio data and send the audio data to the server(s) 120. Alternatively, if the device 110a receives audio data corresponding to the input audio 11 from the microphone array or companion application, the device 110a may simply forward the received audio data to the server(s) 120.

The server(s) 120 receives the audio data (illustrated as 150) and perform speech processing on the audio data to create text (illustrated as 152). For example, the server(s) 120 may perform ASR processing on the audio data to obtain text and may perform NLU on the text. The server(s) 120 then determines the text corresponds to a request to establish a call or other communication (illustrated as 154). The server(s) may additionally determine a recipient and topic (or subject) of the communication request (illustrated as 156). The recipient and/or topic may be determined from post-ASR processed text prior to NLU being performed on the text. Alternatively, the recipient and/or topic may be determined from the text after NLU is performed on the text. In the present example, the server(s) 120 may determine that the word "John" corresponds to the recipient and may identify a "John" in the caller's contacts. The server may then identify a recipient device 110b associated with "John." The server(s) 120 may also be configured to determine the topic by analyzing text for a intent indicator language (e.g., a keyword, phrase, etc.), and determining the topic is text located after the intent indicator language. For example, the intent indicator language may be "about," "reason for my call is," "I'm calling so," etc. According to this example, if the text created from the audio data is "Call John about tomorrow's party", the server(s) 120 may identify "about" as being the keyword and determine "tomorrow's party" is the topic of the communication.

The server(s) 120 may then create an announcement or obtain a recording corresponding to the topic (illustrated as 158). For example, text-to-speech (TTS) processing may be performed on the post-ASR or post-NLU text to create computer generated speech corresponding to the topic of the communication. Alternatively, the server(s) 120 may access a table of user pre-recorded audio or computer pre-generated speech to obtain audio corresponding to the topic of the communication. For example, the user 5 may state "Call John regarding topic 5." The server(s) 120 accesses the table and selects audio associated with "topic 5." For example, the audio associated with topic 5 may state "weekly family dinner," The server(s) 120 may also determine a device associated with the determined recipient (illustrated as 160). For example, once the recipient is determined, the server(s) 120 may access a user profile of the recipient to determine a device associated with the recipient. The server(s) 120 then sends a message indicating a communication is requested and the announcement/recording to the recipient device (i.e., the communication receiving speech controlled device 110b) (illustrated as 162).

The device 110b then outputs an indication demonstrating a communication is requested and/or outputs the announcement/recording audio 13 via one or more speakers 101b of the device 110b. In the alternative, the server(s) 120 may send text, corresponding to the topic, to the device 110b. If this occurs, the device 110b performs TTS processing on the received text to create the audio 13 that is output by one or more speakers 101b of the device 110b. The indication may be the blinking of a light, an audible beep, etc. For further example, the topic audio may correspond to "Incoming call from Michael about tomorrow's party, Accept?" The recipient 7 may then indicate s/he accepts or declines the communication request by physically interacting with the device 110b (e.g., by interacting with one or more buttons on the device 110b). Alternatively, the recipient 7 may indicate s/he accepts or declines the communication audibly. That is, the recipient 7 may speak, for example, either "Yes" or "No". The recipient's spoken acceptance or denial of the communication may be captured by one or more microphones 103b of the device 110b or a microphone array (which is not illustrated and which may be connected directly to the device 110b or indirectly to the device 110b via a companion application run on a smart device). The captured audio is converted into audio data (by either the device 110b or microphone array depending upon implementation), and the audio data is sent to the server(s) 120 by the device 110b.

The server(s) 120 receives the audio data indicating either acceptance or refusal of the requested communication (illustrated as 164), performs processes on the audio data to determine whether the communication is accepted or refused (not illustrated), and establishes a connection between the devices 110*a* and 110*b* if the communication is accepted (illustrated as 166). Optionally, if the communication is accepted, prior to establishing the connection, the server(s) 120 may cause the device 110*a* to audibly indicate (via one or more speakers 101*a* of the device 110*a*) that the communication will be established. The audio output by the device 110*a* may include the topic of the communication. For example, prior to establishing the connection, the server(s) 120 may cause the device 110*a* to output audio corresponding to "Calling John about tomorrow's party".

The recipient may have multiple devices configured to implement teachings of the present disclosure. A user profile of the recipient may identify the multiple devices. For example, after the server 120 determines the recipient, the server 120 may send a "ringing" identifier to all of the devices associated with the recipient's user profile, but may only send the topic audio corresponding to "Incoming call from Michael about tomorrow's party, Accept?" to one of the devices (e.g., a device that the user performs an "answer" operation). Thus, all of the recipient's devices may "ring," but only the device that is answered may output, for example, "Incoming call from Michael about tomorrow's party, Accept?" of "Michael is calling and I am checking to see why." In response, the recipient could state, for example, "Connect Michael" or "OK, thanks, let me know." Once the server 120 has the reason for the call, the server 120 can then communicate the reason to the recipient via the answered device. While it is described that the devices may "ring," it should be appreciated that such ringing may be similar to traditional ringing of a phone, or may be different (e.g., TTS generated audio that functions as a ring).

Figure 2:
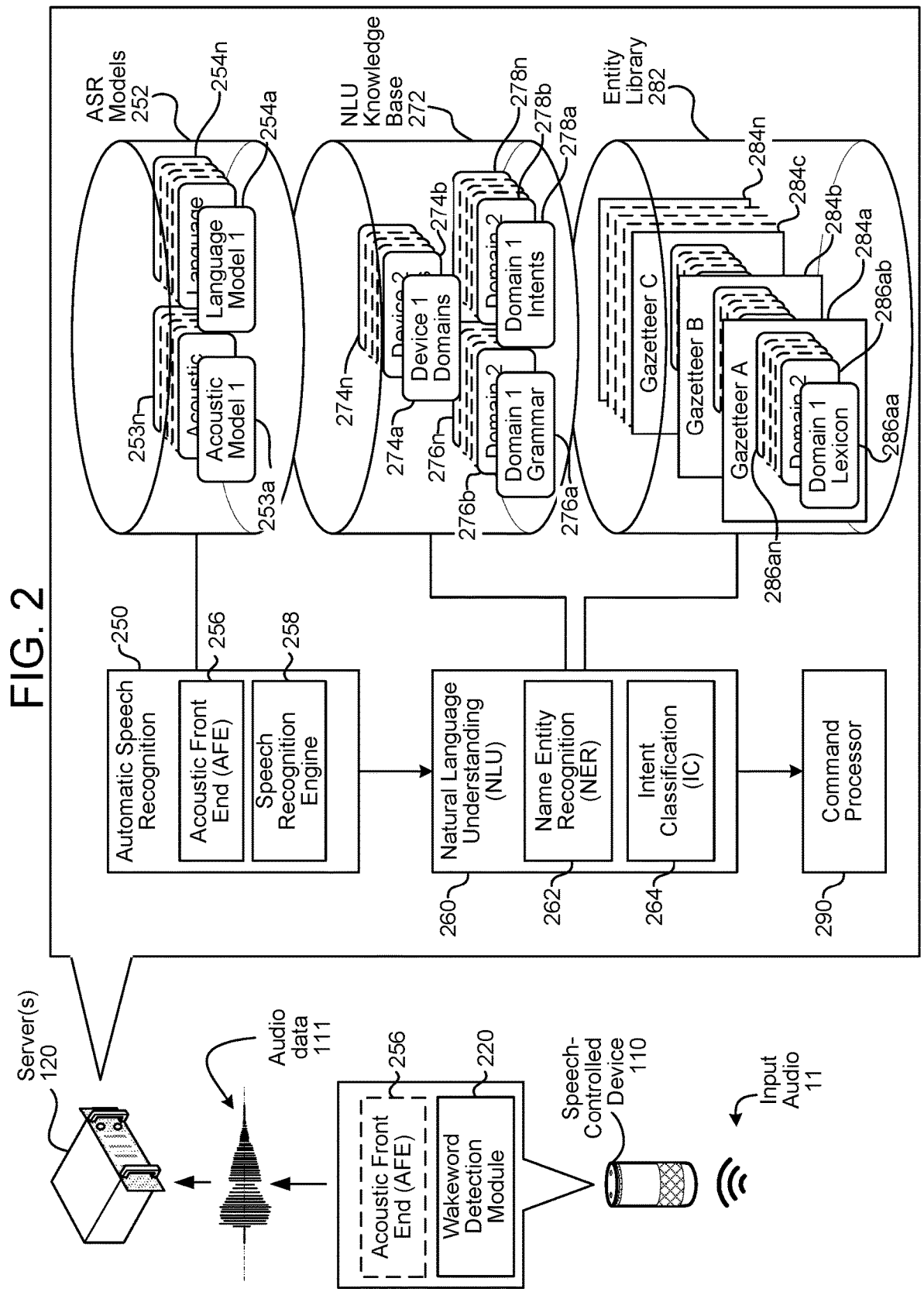
FIG. 2 is a conceptual diagram of a speech processing system according to embodiments of the present disclosure.

Further details of performing communications between two speech-controlled devices are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device 110 sends audio data 111 corresponding to the utterance, to a server 120 that includes an ASR module 250. The audio data 111 may be output from an acoustic front end (AFE) 256 located on the device 110 prior to transmission, or the audio data 111 may be in a different form for processing by a remote AFE 256, such as the AFE 256 located with the ASR module 250.

The wakeword detection module 220 works in conjunction with other components of the device 110, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server 120 for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the MINI and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parse, tag, and annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a database of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
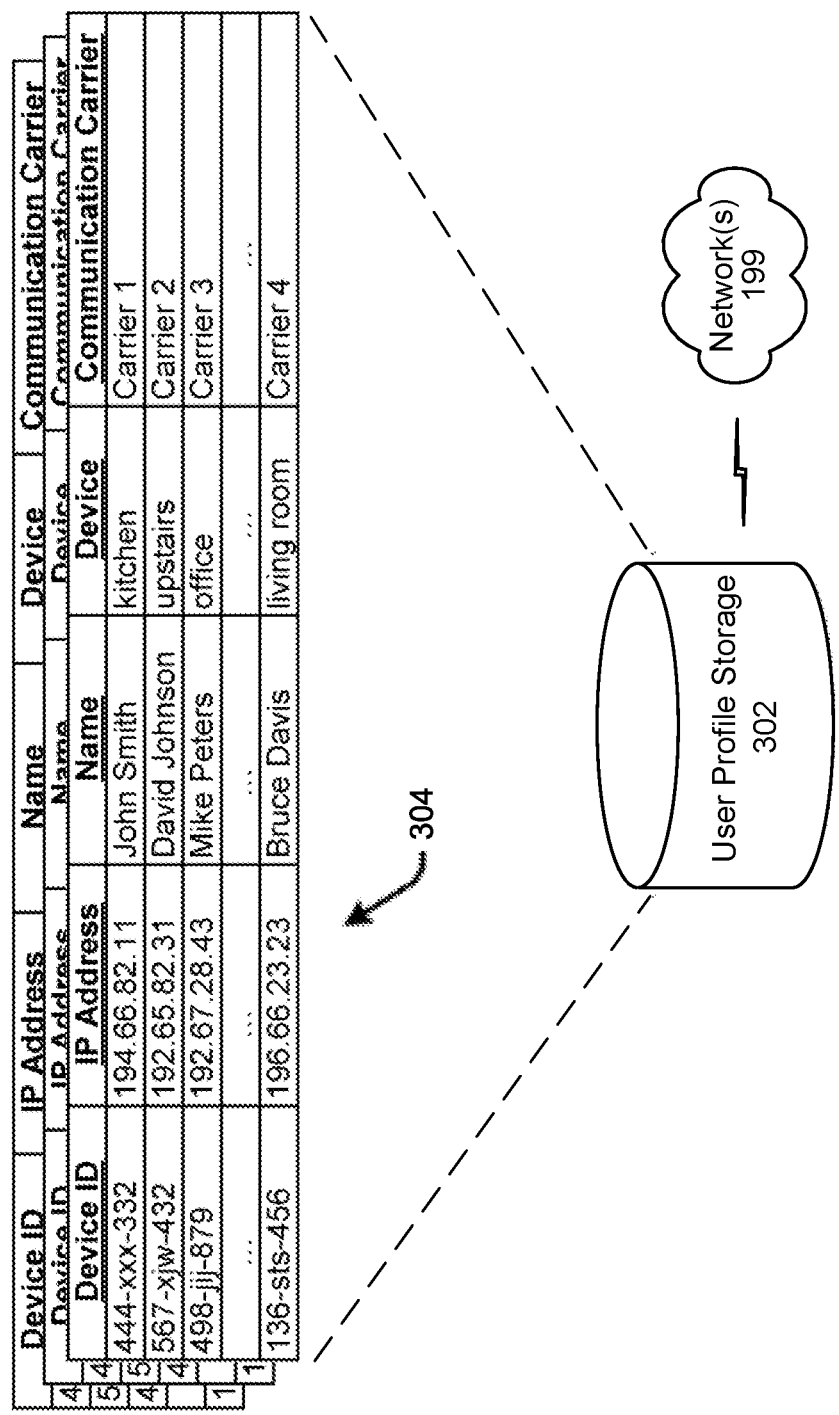
FIG. 3 illustrates data stored and associated with user profiles.

The server 120 may also include data regarding user accounts, shown by the user profile storage 302 illustrated in FIG. 3. The user profile storage may be located proximate to server 120, or may otherwise be in communication with various components, for example over network 199. The user profile storage 302 may include a variety of information related to individual users, accounts, etc. that interact with the system 100. For illustration, as shown in FIG. 3, the user profile storage 302 may include data regarding the devices associated with particular individual user accounts 304. In an example, the user profile storage 302 is a cloud-based storage. Such data may include device identifier (ID) and internet protocol (IP) address information for different devices as well as names by which the devices may be referred to by a user. Further qualifiers describing the devices may also be listed along with a description of the type of object of the device. The user profile storage may additionally include contact information, preferences regarding receiving calls and subject matter (e.g., whether a particular recipient requires a subject for a call from a particular caller), etc.

FIGS. 4A and 4B illustrate a communication request and the establishment of a communication between speech-controlled devices. The communication initiating speech-controlled device 110a receives spoken audio corresponding to a request to establish a communication or call with the communication receiving speech controlled device 110b (illustrated as 402). For example, the spoken audio may include a name of a recipient (i.e., John Smith), a keyword (e.g., about), and a topic (e.g., tomorrow's party). The device 110a converts the received audio into audio data and sends the audio data to the server 120 (illustrated as 404).

The server 120 performs ASR on the audio data to determine text (illustrated as 406), and performs NLU on the text (illustrated as 408). The server 120 determines the first text (either post-ASR or post-NLU) corresponds to a request to establish a call or other communication (illustrated as 409). The server 120 then determines a recipient of the intended communication (illustrated as 410). The server 120 may determine the recipient from the text post-ASR (i.e., pre-NLU) or, alternatively, from the text post-NLU. The server 120 also determines the topic of the intended communication (illustrated as 412). Like determining the recipient, the server 120 may determine the topic from the first text post-ASR (i.e., pre-NLU) or, alternatively, from the first text post-NLU. The server 120 also determines a device associated with the identified recipient (i.e., the communication receiving speech-controlled device 110b) (illustrated as 414). Determination of the recipient's device may be performed after determination of the recipient, or after determination of the recipient and topic. Moreover, determination of the recipient's device may involve accessing a user profile of the recipient (as illustrated in FIG. 3). Once the recipient (and optionally the topic) is determined, the server 120 may access the recipient's user profile to determine a device associated with the recipient that is configured to perform audible and/or visual communications or calls with other devices. The server 120 additionally creates an announcement or obtain a recording to be output by the recipient's device (illustrated as 416). For example, the server 120 may perform text-to-speech (TTS) processing on the post-ASR/pre-NLU or post-NLU text to create audio data including computer generated speech corresponding to the topic of the communication. Alternatively, the server 120 may access a table of user pre-recorded audio data or computer pre-generated speech to obtain audio data corresponding to the topic of the communication. In an example, the post-ASR and/or post-NLU text may contain a topic identifier, rather than an actual topic. In this instance, the server 120 may access a table of topic language/text and/or audio data (either user or computer generated) associated with the caller's speech-controlled device 110a. Using the topic identifier, the server 120 may locate language/text and/or audio data within the table corresponding to the topic of the requested communication. The server 120 then sends a message regarding the requested communication/call and the announcement/recording audio data to the recipient's device (i.e., the communication receiving speech-controlled device 110b) (illustrated as 418). For example, the topic identifier may correspond to "topic 2," and the corresponding text/audio in the table may correspond to "weekly family dinner."

As illustrated in FIG. 4B, the device 110b may merely output an indication of the requested communication/call (illustrated as 420). For example, the indication may be audible (e.g., the device 110b may output audio corresponding to "Incoming call") and/or visual (i.e., the blinking of a light, an audible beep, etc.). The device 110b may also output a visual indication via a display of the device 110b. For example, the device 110b may output a message on the display indicating an incoming call (e.g., "You're getting a call from John about tomorrow's meeting."). Alternatively, the device 110b may simply output announcement/recording audio (illustrated as 422). If the announcement/recording is received as audio data, the device 110b may simply output audio corresponding to the audio data. If the announcement/recording is received as text data, the device 110b may perform TTS processing on the text data to create audio data, which the device 110b then outputs. Still further, instead of outputting only the indication or only the announcement/recording audio, the device 110b may output both the indication and the announcement/recording audio (illustrated as 424). Thereafter, the recipient may speak its acceptance of the communication request, with the spoken audio being captured by the device 110b (illustrated as 426). The device 110b sends audio data corresponding to the received acceptance audio to the server 120 (illustrated as 428).

The server 120 performs ASR on the received audio data to determine text (illustrated as 430), and performs NLU on the text (illustrated as 432). The server 120 then determines the text indicates the recipient accepted the communication request (illustrated as 434). Determining the acceptance of the communication request may involve analyzing the post-ASR text or the post-NLU text. Optionally, the server 120, upon determining the recipient accepted the communication request, may cause the communication initiating speech-controlled device 110a to output an indication (e.g., audible, visual, audible and visual, etc.) that the communication request is accepted. The server 120 also causes a connection to be established between the devices 110a and 110b (e.g., causes audio data from the devices 110a and 110b to be exchanged) (illustrated as 436). For example, the server 120 may facilitate a connection where the server 120 is an intermediary through which the communication occurs. Alternatively, the communication may be performed via the Internet or a communication network.

In an example, a caller may not include a topic of the call within the request to establish the call. The recipient may require a topic for a call (i.e., all the time or only calls from specific callers). When no topic is included in the call request and the recipient requires a topic, the server 120 may use TTS processing to generate audio corresponding to, for example, "Hi, this is [recipient's name] automated assistant. [Recipient's name] has asked that I find out why you are calling. Would you please tell me why you are calling?" The server 120 may cause the caller's speech-controlled device 110a to output the TTS generated audio. In response, the caller may say, for example "Hi, I'm calling to discuss last night's television show." The caller's speech-controlled device 110a may convert the spoken audio of the caller into audio data, which is sent to the server 120. The server 120 may perform ASR on the audio data to create text, and NLU on the text to identify intent indicator language (i.e., "I'm calling to discuss") and topic language (i.e., "last night's television show"). In response to identifying the topic language, the server 120 may use TTS processing to generate audio corresponding to, for example, "OK thanks, let me tell [recipient's name] you are calling about [topic language (i.e., last night's television show)] and see if [recipient's name] is available." The server 120 may cause this audio to be output to the caller via the caller's speech-controlled device 110a. The caller may optionally speak his or her confirmation that the topic for the call indicated in the TTS generated audio is correct. The confirmation may then be communicated to the server 120. Either simultaneously or after receiving the confirmation, the server 120 may use TTS processing to generate audio corresponding to, for example, "[Recipient name], [caller name] is calling about [topic language (i.e., last night's television show)], would you like to be connected to [caller name]?" The server 120 may cause the recipient's speech-controlled device 110b to output this audio. In order for this example to work, the system of the present disclosure should be able to identify content for the above bracketed language portions in each call setting, using an intent-based templating approach as described in detail herein. Using the identified content, the system may use the call-specific information to provide a call-specific TTS to two different parties. This scenario is technically described with respect to FIGS. 5A through 5C.

Figure 5A:
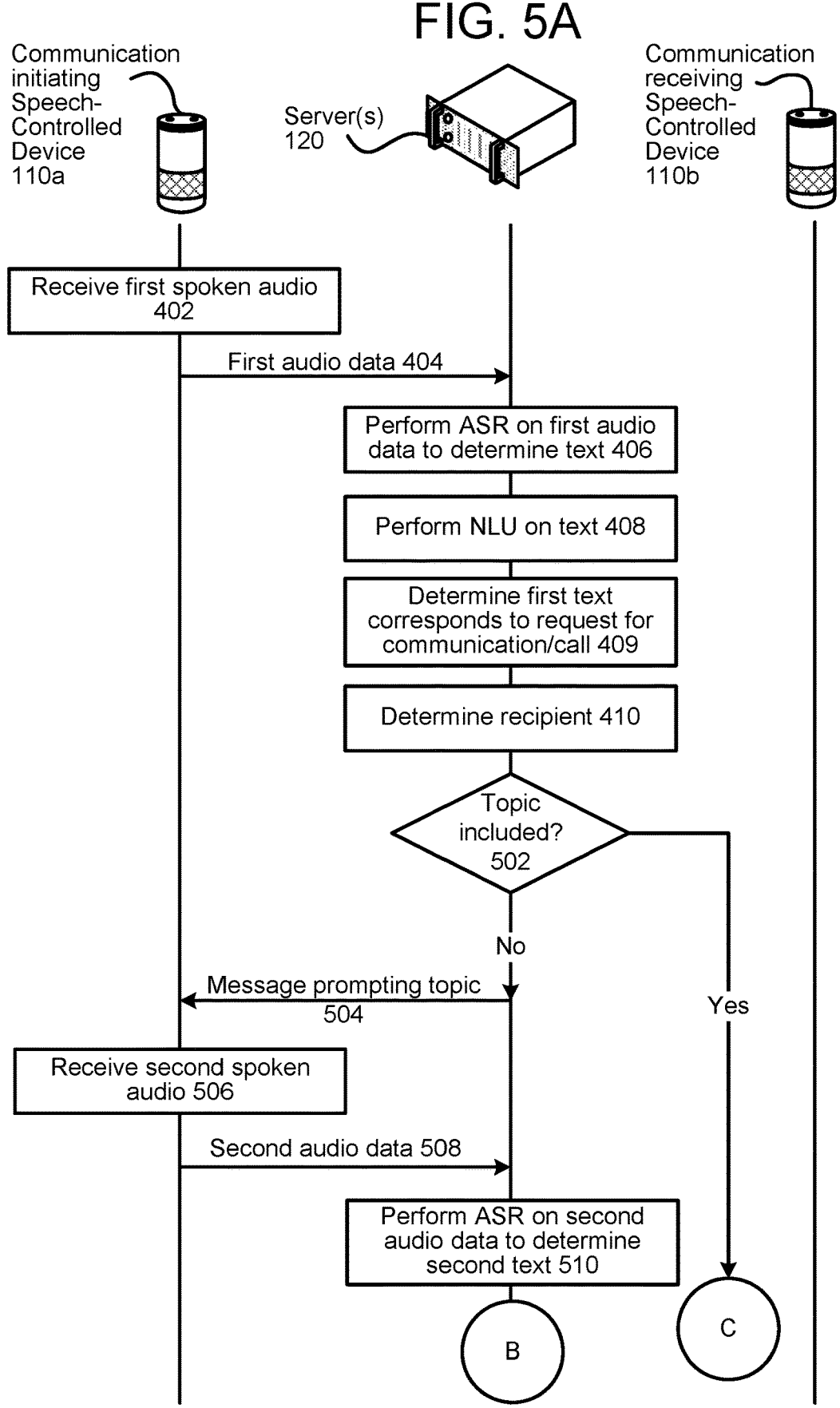
Figure 5B:
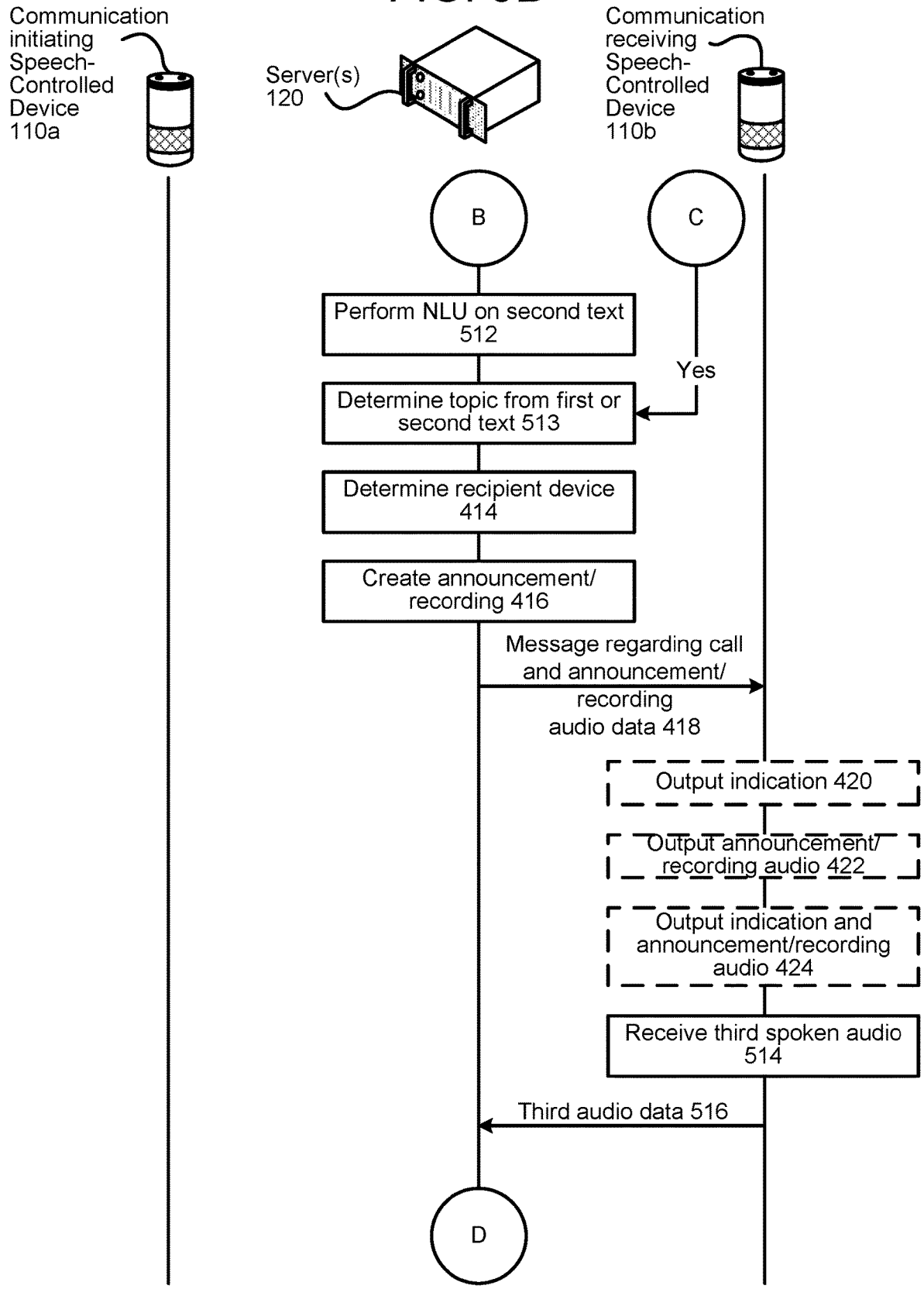
Figure 6A:
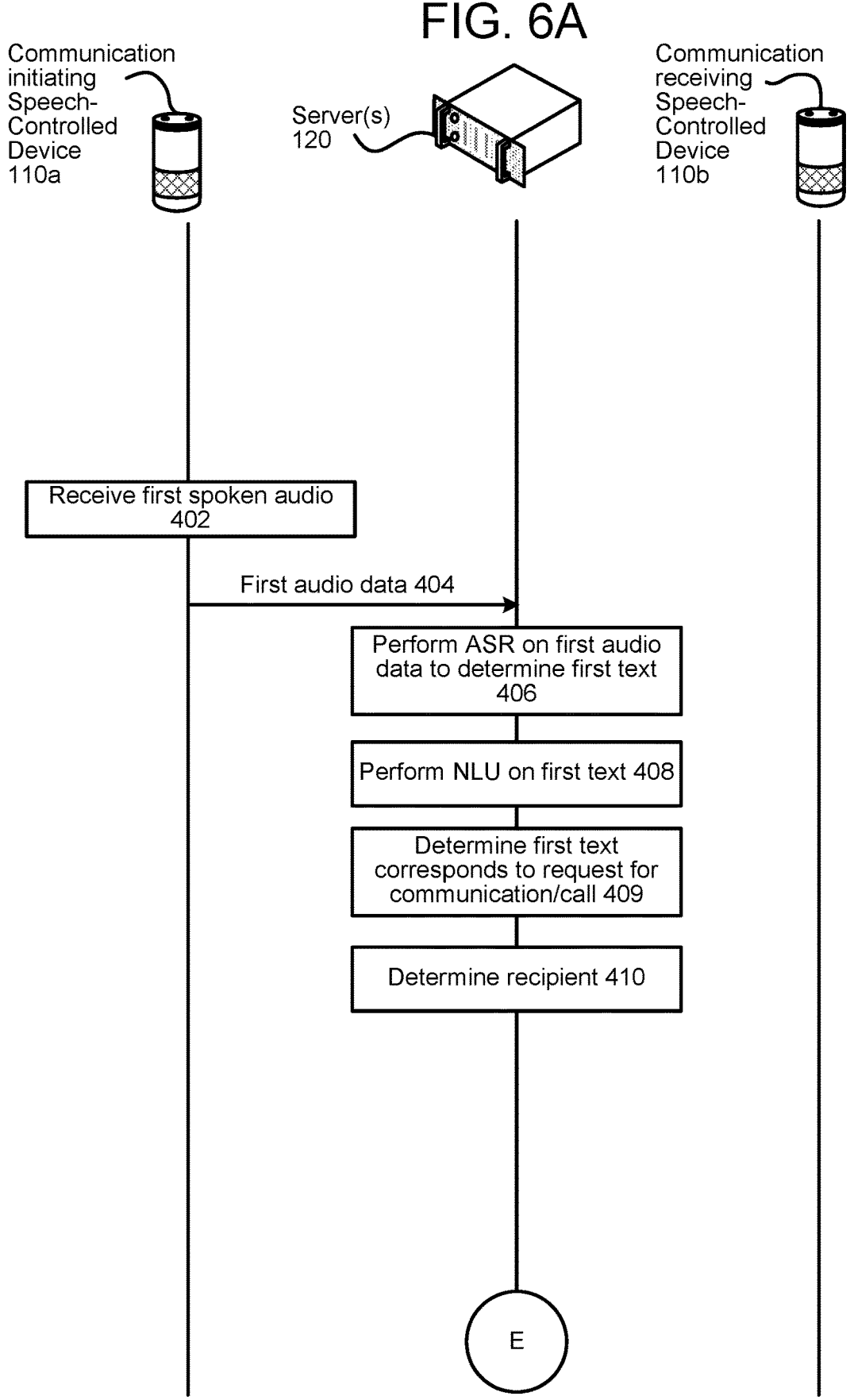

As illustrated in FIG. 5A, the communication initiating speech-controlled device 110a receives spoken audio corresponding to a request to establish a communication or call (illustrated as 402). For example, the spoken audio may include a name of a recipient (i.e., John Smith), a keyword (e.g., about), and a topic (e.g., tomorrow's party). The device 110a converts the received audio into audio data and sends the audio data to the server 120 (illustrated as 404).

The server 120 performs ASR on the audio data to determine text (illustrated as 406), and performs NLU on the text (illustrated as 408). The server 120 determines the first text (either post-ASR or post-NLU) corresponds to a request to establish a call or other communication (illustrated as 409). The server 120 then determines a recipient of the intended communication (illustrated as 410). The server 120 may determine the recipient from the text post-ASR (i.e., pre-NLU) or, alternatively, from the text post-NLU. The server 120 also determines whether a topic for the communication is included within the text (illustrated as 502). If a topic is not included in the text, the server 120 sends a message to the device 110a, prompting the device 110a to capture additional audio corresponding to a topic of the communication (illustrated as 504). Upon receiving audio corresponding to the topic (illustrated as 506), the device 110a converts the audio into audio data, and sends the audio data to the server 120 (illustrated as 508). The server 120 then performs ASR on the audio data to determine text (illustrated as 510), and performs NLU on the text (illustrated as 512 in FIG. 5B). The server 120 then determines the topic for the communication (illustrated as 513). The server 120 may determine the topic from the post-ASR (i.e., pre-NLU) or, alternatively, post-NLU text. The server 120 also determines a device associated with the identified recipient (i.e., the communication receiving speech-controlled device 110b) (illustrated as 414). Determination of the recipient's device may be performed after determination of the recipient, or after determination of the recipient and topic. Moreover, determination of the recipient's device may involve accessing a user profile of the recipient (as illustrated in FIG. 3). The server 120 may access the recipient's user profile to determine a device associated with the recipient that is configured to perform audible and/or visual communications or calls with other devices. The server 120 additionally creates an announcement or obtains a recording to be output by the recipient's device (illustrated as 416). For example, the server 120 may perform TTS processing on post-ASR/pre-NLU or post-NLU text to create computer generated speech corresponding to the topic of the intended communication. Alternatively, the server 120 may access a table of user pre-recorded audio data or computer pre-generated speech to obtain audio data corresponding to the topic of the communication. In an example, audio captured by the device 110*a* may contain a topic identifier, rather than an actual topic. In this instance, the server 120 may access a table of topic language/text and/or audio data (either user or computer generated) associated with the caller's speech-controlled device 110*a*. Using the topic identifier, the server 120 may locate language/text and/or audio data within the table corresponding to the topic of the requested communication. The server 120 then sends a message regarding the requested communication/call and the announcement/recording audio data to the recipient's device (i.e., the communication receiving speech-controlled device 110*b*) (illustrated as 418). For example, the topic identifier may correspond to "topic 2," and the corresponding text/audio in the table may correspond to "weekly family dinner."

The device 110*b* may merely output an indication of the requested communication/call (illustrated as 420). For example, the indication may be audible (e.g., the device 110*b* may output audio corresponding to "Incoming call") and/or visual (i.e., the blinking of a light, an audible beep, etc.). Alternatively, the device 110*b* may simply output announcement/recording audio (illustrated as 422). If the announcement/recording is received as audio data, the device 110*b* may simply output audio corresponding to the audio data. If the announcement/recording is received as text data, the device 110*b* may perform TTS processing on the text data to create announcement/recording audio data, which the device 110*b* then outputs. Still further, instead of outputting only the indication or only the announcement/recording audio, the device 110*b* may output both the indication and the announcement/recording audio (illustrated as 424). Thereafter, the recipient may speak his/her acceptance of the communication request, with the spoken audio being captured by the device 110*b* (illustrated as 514). The device 110*b* sends audio data corresponding to the received acceptance audio to the server 120 (illustrated as 516).

As illustrated in FIG. 5C, the server 120 performs ASR on the received audio data to determine text (illustrated as 518), and performs NLU on the text (illustrated as 520). The server 120 then determines the text indicates the recipient accepted the communication request (illustrated as 434). Determining the acceptance of the communication request may involve analyzing the post-ASR text or the post-NLU text. Optionally, the server 120, upon determining the recipient accepted the communication request, may cause the communication initiating speech-controlled device 110*a* to output an indication (e.g., audible, visual, audible and visual, etc.) that the communication request is accepted. The server 120 also causes a connection to be established between the device 110*a* and 110*b* (e.g., causes audio data from the devices 110*a* and 110*b* to be exchanged) (illustrated as 436). For example, the server 120 may facilitate a connection where the server 120 is an intermediary through which the communication occurs. Alternatively, the communication may be performed via the Internet or a communication network.

FIGS. 6A through 6D illustrate a communication request and the establishment of a communication between speech-controlled devices. The communication initiating speech-controlled device 110*a* receives spoken audio corresponding to a request to establish a communication or call (illustrated as 402). For example, the spoken audio may include a name of a recipient (i.e., John Smith), a keyword (e.g., about), and a topic (e.g., tomorrow's party). The device 110*a* converts the received audio into audio data and sends the audio data to the server 120 (illustrated as 404).

The server 120 performs ASR on the audio data to determine text (illustrated as 406), and performs NLU on the text (illustrated as 408). The server 120 determines the first text (either post-ASR or post-NLU) corresponds to a request to establish a call or other communication (illustrated as 409). The server 120 then determines a recipient of the intended communication (illustrated as 410). The server 120 may determine the recipient from the text post-ASR (i.e., pre-NLU) or, alternatively, from the text post-NLU. The server 120 then determines whether the recipient requires a topic for communication requests originating from the caller and/or the communication initiating speech-controlled device 110*a* (illustrated as 602 in FIG. 6B). To perform this determination, the server 120 may access a user profile, such as user profile 304, of the recipient, which may contain a list of callers and/or devices. Associated with each identified caller and/or device may be an indication detailing whether a communication/call request originating from the particular caller and/or device requires a topic. If the server 120 determines communication/call requests originating from the caller and/or the device 110*a* require a topic, the server 120 then determines whether a topic is included in the text either post-ASR or post-NLU (illustrated as 502). If a topic is not included in the text, the server 120 sends a message to the device 110*a*, prompting the device 110*a* to capture additional audio corresponding to a topic of the communication (illustrated as 504). Upon receiving audio corresponding to the topic (illustrated as 506), the device 110*a* converts the audio into audio data, and sends the audio data to the server 120 (illustrated as 508). The server 120 then performs ASR on the audio data to determine text (illustrated as 510), and performs NLU on the text (illustrated as 512). The server 120 then determines the topic for the communication (illustrated as 513). The server 120 may determine the topic from the text post-ASR (i.e., pre-NLU) or, alternatively, post-NLU. The server 120 also determines a device associated with the identified recipient (illustrated as 414). Determination of the recipient's device may be performed after determination of the recipient, or after determination of the recipient and topic. Moreover, determination of the recipient's device may involve accessing a user profile of the recipient (as illustrated in FIG. 3). The server 120 may access the recipient's user profile to determine a device associated with the recipient that is configured to perform audible and/or visual communications or calls with other devices. The server 120 additionally creates an announcement or obtains a recording to be output by the recipient's device (illustrated as 416). For example, the server 120 may perform text-to-speech (TTS) processing on post-ASR/pre-NLU or post-NLU text to create computer generated speech corresponding to the topic of the intended communication. Alternatively, the server 120 may access a table of user pre-recorded audio data or computer pre-generated speech to obtain audio data corresponding to the topic of the communication. In an example, the audio captured by the device 110*a* may contain a topic identifier, rather than an actual topic. In this instance, the server 120 may access a table of topic language/text and/or audio data (either user or computer generated) associated with the caller's speech-controlled device 110a. Using the topic identifier, the server 120 may locate language/text and/or audio data within the table corresponding to the topic of the requested communication. The server 120 then sends a message regarding the requested communication/call and the announcement/recording audio data to the recipient's device (i.e., the communication receiving speech-controlled device 110b) (illustrated as 418). For example, the topic identifier may correspond to "topic 2," and the corresponding text/audio in the table may correspond to "weekly family dinner."

The device 110b may merely output an indication of the requested communication/call (illustrated as 420). For example, the indication may be audible (e.g., the device 110b may output audio corresponding to "Incoming call") and/or visual (i.e., the blinking of a light, an audible beep, etc.). Alternatively, the device 110b may simply output the announcement/recording audio (illustrated as 422). If the announcement/recording is received as audio data, the device 110b may simply output audio corresponding to the audio data. If the announcement/recording is received as text data, the device 110b may perform TTS processing on the text data to create announcement/recording audio data, which the device 110b then outputs. Still further, instead of outputting only the indication or only the announcement/recording audio, the device 110b may output both the indication and the announcement/recording audio (illustrated as 424). Thereafter, the recipient may speak its acceptance of the communication request, with the spoken audio being captured by the device 110b (illustrated as 514). The device 110b sends audio data corresponding to the received acceptance audio to the server 120 (illustrated as 516).

The server 120 performs ASR on the received audio data to determine third text (illustrated as 518), and performs NLU on the text (illustrated as 520 in FIG. 6D). The server 120 then determines the text indicates the recipient accepted the communication request (illustrated as 434). Determining the acceptance of the communication request may involve analyzing the post-ASR text or the post-NLU text. Optionally, the server 120, upon determining the recipient accepted the communication request, may cause the communication initiating speech-controlled device 110a to output an indication (e.g., audible, visual, audible and visual, etc.) that the communication request is accepted. The server 120 also causes a connection to be established between the devices 110a and 110b (e.g., causes audio data from the devices 110a and 110b to be exchanged) (illustrated as 436). For example, the server 120 may facilitate a connection where the server 120 is an intermediary through which the communication occurs. Alternatively, the communication may be performed via the Internet or a communication network.

Figure 7B:
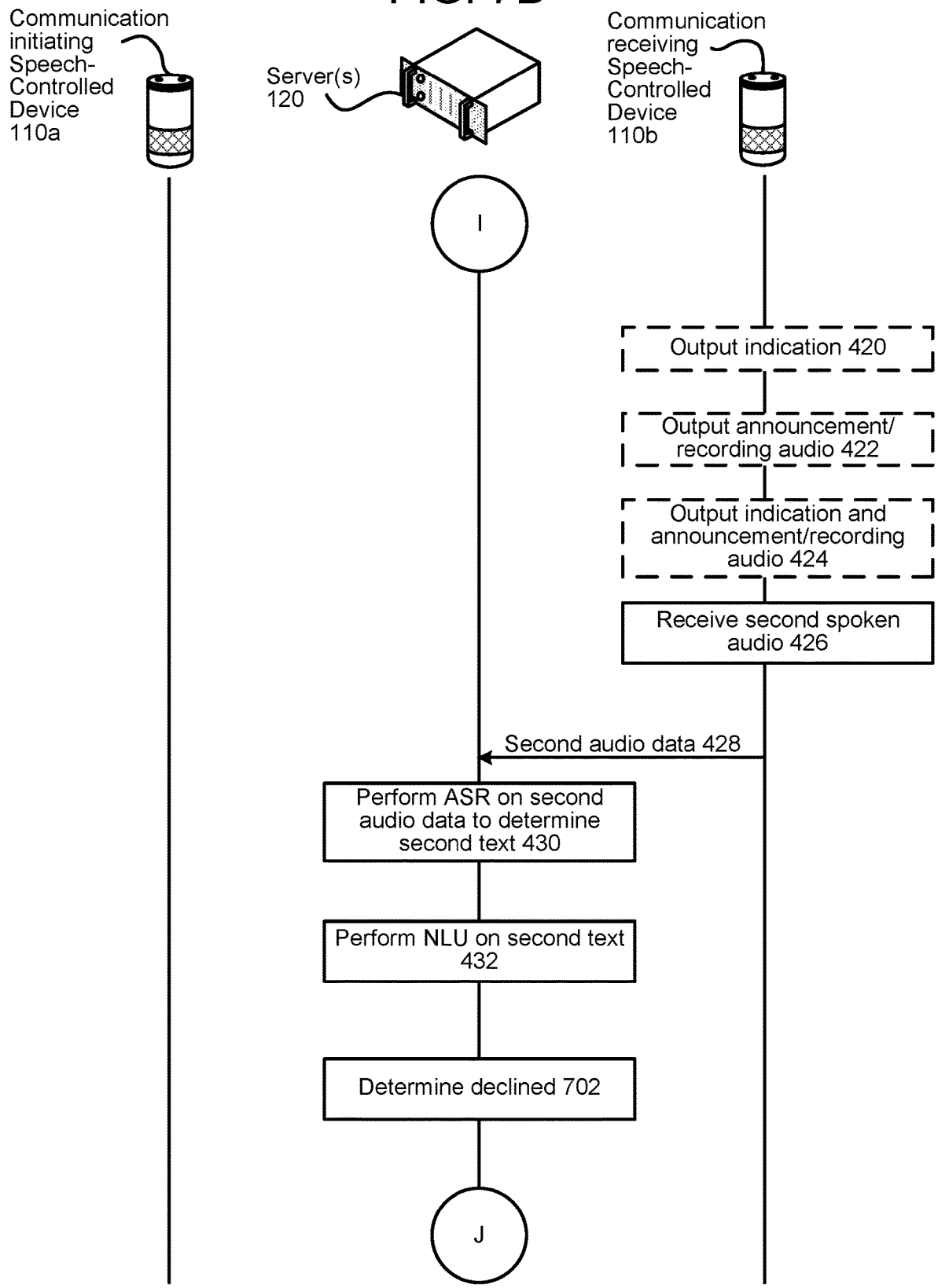

FIGS. 7A through 7C illustrate a communication request and the refusal of a communication between speech-controlled devices. The communication initiating speech-controlled device 110a receives spoken audio corresponding to a request to establish a communication or call (illustrated as 402). For example, the spoken audio may include a name of a recipient (i.e., John Smith), a keyword (e.g., about), and a topic (e.g., tomorrow's party). The device 110a converts the received audio into audio data and sends the audio data to the server 120 (illustrated as 404).

The server 120 performs ASR on the audio data to determine text (illustrated as 406), and performs NLU on the text (illustrated as 408). The server 120 determines the first text (either post-ASR or post-NLU) corresponds to a request to establish a call or other communication (illustrated as 409). The server 120 then determines a recipient of the intended communication (illustrated as 410). The server 120 may determine the recipient from the text post-ASR (i.e., pre-NLU) or, alternatively, from the text post-NLU. The server 120 also determines the topic of the intended communication (illustrated as 412). Like determining the recipient, the server 120 may determine the topic from the text post-ASR (i.e., pre-NLU) or, alternatively, from the text post-NLU. The server 120 also determines a device associated with the identified recipient (i.e., the communication receiving speech-controlled device 110b) (illustrated as 414). Determination of the recipient's device may be performed after determination of the recipient, or after determination of the recipient and topic. Moreover, determination of the recipient's device may involve accessing a user profile of the recipient (as illustrated in FIG. 3). Once the recipient (and optionally the topic) is determined, the server 120 may access the recipient's user profile to determine a device associated with the recipient that is configured to perform audible and/or visual communications or calls with other devices. The server 120 additionally creates an announcement or obtains a recording to be output by the recipient's device (illustrated as 416). For example, the server 120 may perform TTS processing on the post-ASR/pre-NLU or post-NLU text to create computer generated speech corresponding to the topic of the intended communication. Alternatively, the server 120 may access a table of user pre-recorded audio data or computer pre-generated speech to obtain audio data corresponding to the topic of the communication. In an example, the post-ASR and/or post-NLU text may contain a topic identifier, rather than an actual topic. In this instance, the server 120 may access a table of topic language/text and/or audio data (either user or computer generated) associated with the caller's speech-controlled device 110a. Using the topic identifier, the server 120 may locate language/text and/or audio data within the table corresponding to the topic of the requested communication. The server 120 then sends a message regarding the requested communication/call and the announcement/recording audio data to the recipient's device (illustrated as 418). For example, the topic identifier may correspond to "topic 2," and the corresponding text/audio in the table may correspond to "weekly family dinner."

As illustrated in FIG. 7B, the device 110b may merely output an indication of the requested communication/call (illustrated as 420). For example, the indication may be audible (e.g., the device 110b may output audio corresponding to "Incoming call") and/or visual (i.e., the blinking of a light, an audible beep, etc.). Alternatively, the device 110b may simply output announcement/recording audio (illustrated as 422). If the announcement/recording is received as audio data, the device 110b may simply output audio corresponding to the audio data. If the announcement/recording is received as text data, the device 110b may perform TTS processing on the text data to create audio data, which the device 110b then outputs. Still further, instead of outputting only the indication or only the announcement/recording audio, the device 110b may output both the indication and the announcement/recording audio (illustrated as 424). Thereafter, the recipient may speak its acceptance or refusal of the communication request, with the spoken audio being captured by the device 110b (illustrated as 426). For example, the recipient may state "No, tell him that I will call back in an hour." The device 110b sends audio data corresponding to the received audio to the server 120 (illustrated as 428).

The server 120 performs ASR on the received audio data to determine text (illustrated as 430), and performs NLU on the text (illustrated as 432). The server 120 then determines the text post-ASR and/or post-NLU indicates the communication request is declined by the recipient (illustrated as 702). The server 120 may then determine if the post-ASR or post-NLU text included a reason for the refusal of the communication request (illustrated as 704 in FIG. 7C). If a reason is present in the text, the server 120 causes the communication initiating speech-controlled device 110a to output (e.g., audibly) the reason (illustrated as 706). For example, the device 110a may audibly output computer generated speech stating "Sorry, [recipient] can't take your call, he said that he will call back in an hour." In an unillustrated implementation, the device 110a and server 120 may be configured to capture and convey an audible message to leave for the recipient. After either determining no reason is present in the text or causing the device 110a to output the reason, the server 120 may determine whether the post-ASR or post-NLU text includes reschedule information (e.g., an alternative time and/or date to perform the communication) (illustrated as 708). If reschedule information is present in the text, the server 120 may cause the device 110a to output (e.g., audibly) the reschedule information (illustrated as 710) and/or may send reschedule information data to a calendar processor associated with the device 110a (illustrated as 712). For example, the server 120 may determine a calendar processor associated with the device 110a using a user profile associated with the device 110a. Further, the system (e.g., the server 120) may be configured to set a reminder or re-prompt the device 110a at or prior to the rescheduled time for the call.

FIGS. 8A and 8B illustrate a communication request and the establishment and/or refusal of a communication between speech-controlled devices. The communication initiating speech-controlled device 110a receives spoken audio corresponding to a request to establish a communication or call (illustrated as 402). For example, the first spoken audio may include a name of a recipient (i.e., John Smith), a keyword (e.g., about), and a topic (e.g., tomorrow's party). The device 110a converts the received audio into audio data and sends the audio data to the server 120 (illustrated as 404).

The server 120 performs ASR on the audio data to determine text (illustrated as 406), and performs NLU on the text (illustrated as 408). The server 120 determines the first text (either post-ASR or post-NLU) corresponds to a request to establish a call or other communication (illustrated as 409). The server 120 then determines a recipient of the intended communication (illustrated as 410). The server 120 may determine the recipient from the text post-ASR (i.e., pre-NLU) or, alternatively, from the text post-NLU. The server 120 also determines the topic of the intended communication (illustrated as 412). Like determining the recipient, the server 120 may determine the topic from the text post-ASR (i.e., pre-NLU) or, alternatively, from the text post-NLU. The server 120 also determines a device associated with the identified recipient (i.e., the communication receiving speech-controlled device 110b) (illustrated as 414). Determination of the recipient's device may be performed after determination of the recipient, or after determination of the recipient and topic. Moreover, determination of the recipient's device may involve accessing a user profile of the recipient (as illustrated in FIG. 3). Once the recipient (and optionally the topic) is determined, the server 120 may access the recipient's user profile to determine a device associated with the recipient that is configured to perform audible and/or visual communications or calls with other devices. The server 120 additionally creates an announcement or obtains a recording to be output by the recipient's device (illustrated as 416). For example, the server 120 may perform TTS processing on the post-ASR/pre-NLU or post-NLU text to create computer generated speech corresponding to the topic of the intended communication. Alternatively, the server 120 may access a table of user pre-recorded audio data or computer pre-generated speech to obtain audio data corresponding to the topic of the communication. In an example, the post-ASR and/or post-NLU text may contain a topic identifier, rather than an actual topic. In this instance, the server 120 may access a table of topic language/text and/or audio data (either user or computer generated) associated with the caller's speech-controlled device 110a. Using the topic identifier, the server 120 may locate language/text and/or audio data within the table corresponding to the topic of the requested communication. The server 120 then sends a message regarding the requested communication/call and the announcement/recording audio data to the recipient's device (illustrated as 418). For example, the topic identifier may correspond to "topic 2," and the corresponding text/audio in the table may correspond to "weekly family dinner."

As illustrated in FIG. 8B, the device 110b may merely output an indication of the requested communication/call (illustrated as 420). For example, the indication may be audible (e.g., the device 110b may output audio corresponding to "Incoming call") and/or visual (i.e., the blinking of a light, an audible beep, etc.). Alternatively, the device 110b may simply output announcement/recording audio (illustrated as 422). If the announcement/recording is received as audio data, the device 110b may simply output audio corresponding to the audio data. If the announcement/recording is received as text data, the device 110b may perform TTS processing on the text data to create audio data, which the device 110b then outputs. Still further, instead of outputting only the indication or only the announcement/recording audio, the device 110b may output both the indication and the announcement/recording audio (illustrated as 424). Thereafter, the recipient may accept or refuse the communication request by physically interacting with the device 110b (illustrated as 802). For example, the recipient may interact with one or more buttons of the device 110b. The device 110b sends data corresponding to the physical interaction to the server 120 (illustrated as 804).

The server 120 uses the received physical interaction data to determine whether the communication request is accepted or declined (illustrated as 806). If the physical interaction data indicates the communication request is accepted, the server 120 causes a connection to be established between the device 110a and 110b (e.g., causes audio data from the devices 110a and 110b to be exchanged) (illustrated as 436). In an unillustrated implementation, if the server 120 determines the physical interaction data indicates the communication request is refused, the device 110a and server 120 may be configured to capture and convey an audible message to leave for the recipient.

FIGS. 9A through 9D illustrate a communication request and the subsequent request for a communication topic between speech-controlled devices. The communication initiating speech-controlled device 110a receives spoken audio corresponding to a request to establish a communication or call (illustrated as 402). For example, the spoken audio may include a name of a recipient (i.e., John Smith). The device 110a converts the received audio into audio data and sends the audio data to the server 120 (illustrated as 404).

The server 120 performs ASR on the audio data to determine text (illustrated as 406), and performs NLU on the text (illustrated as 408). The server 120 determines the first text (either post-ASR or post-NLU) corresponds to a request to establish a call or other communication (illustrated as 409). The server 120 then determines a recipient of the intended communication (illustrated as 410). The server 120 may determine the recipient from the text post-ASR (i.e., pre-NLU) or, alternatively, from the text post-NLU. The server 120 also determines a device associated with the identified recipient (i.e., the communication receiving speech-controlled device 110*b*) (illustrated as 414). Determination of the recipient's device may involve accessing a user profile of the recipient (as illustrated in FIG. 3). Once the recipient is determined, the server 120 may access the recipient's user profile to determine a device associated with the recipient that is configured to perform audible and/or visual communications or calls with other devices. The server 120 additionally creates an announcement or obtains a recording to be output by the recipient's device (illustrated as 416). For example, the server 120 may perform TTS processing on the post-ASR/pre-NLU or post-NLU text to create computer generated speech corresponding to "Incoming call from Mark." The server 120 then sends a message regarding the requested communication/call and the announcement/recording audio data to the recipient's device (illustrated as 418).

As illustrated in FIG. 9B, the device 110*b* may merely output an indication of the requested communication/call (illustrated as 420). For example, the indication may be audible (e.g., the device 110*b* may output audio corresponding to "Incoming call") and/or visual (i.e., the blinking of a light, an audible beep, etc.). Alternatively, the device 110*b* may simply output announcement/recording audio (e.g., "Incoming call from Mark") (illustrated as 422). If the announcement/recording is received as audio data, the device 110*b* may simply output audio corresponding to the audio data. If the announcement/recording is received as text data, the device 110*b* may perform TTS processing on the text data to create audio data, which the device 110*b* then outputs. Still further, instead of outputting only the indication or only the announcement/recording audio, the device 110*b* may output both the indication and the announcement/recording audio (illustrated as 424). The recipient may desire to know why the caller is calling. Thus, the recipient may verbally request a topic for the call, with the spoken audio being captured by the device 110*b* (illustrated as 426). For example, the recipient may state "What is the reason for the call," "Why is Mark calling," etc. The device 110*b* sends audio data corresponding to the received audio to the server 120 (illustrated as 428).

The server 120 performs ASR on the received audio data to determine text (illustrated as 430), and performs NLU on the text (illustrated as 432). The server 120 then determines the text post-ASR and/or post-NLU corresponds to a request for a topic of the call (illustrated as 902). The server 120 then sends a message to the device 110*a*, prompting the device 110*a* to capture additional audio corresponding to a topic of the communication (illustrated as 504 in FIG. 9C). Upon receiving audio corresponding to the topic (illustrated as 506), the device 110*a* converts the audio into audio data, and sends the audio data to the server 120 (illustrated as 508). The server 120 then performs ASR on the audio data to determine text (illustrated as 510), and performs NLU on the text (illustrated as 512 in FIG. 5B). The server 120 then determines the topic for the communication (illustrated as 904). The server 120 may determine the topic from the post-ASR (i.e., pre-NLU) or, alternatively, post-NLU text. The server 120 then sends audio data corresponding to the topic to the recipient's speech-controlled device 110*b* (illustrated as 906).

The recipient's speech-controlled device 110*b* may optionally output a visual (e.g., blinking light) or verbal (e.g., "Topic received") indication of the topic (illustrated as 908). The recipient's speech-controlled device 110*b* also outputs the topic (illustrated as 910). The topic may be visually output by a display of the device (i.e., in the form of text) and/or may be output audibly (e.g., "Mark is calling about today's meeting"). Thereafter, the recipient may speak its acceptance of the communication request, with the spoken audio being captured by the device 110*b* (illustrated as 426). The device 110*b* sends audio data corresponding to the received acceptance audio to the server 120 (illustrated as 428 in FIG. 9D).

The server 120 performs ASR on the received audio data to determine text (illustrated as 430), and performs NLU on the text (illustrated as 432). The server 120 then determines the text indicates the recipient accepted the communication request (illustrated as 434). Determining the acceptance of the communication request may involve analyzing the post-ASR text or the post-NLU text. Optionally, the server 120, upon determining the recipient accepted the communication request, may cause the communication initiating speech-controlled device 110*a* to output an indication (e.g., audible, visual, audible and visual, etc.) that the communication request is accepted. The server 120 also causes a connection to be established between the devices 110*a* and 110*b* (e.g., causes audio data from the devices 110*a* and 110*b* to be exchanged) (illustrated as 436). For example, the server 120 may facilitate a connection where the server 120 is an intermediary through which the communication occurs. Alternatively, the communication may be performed via the Internet or a communication network.

Figure 11:
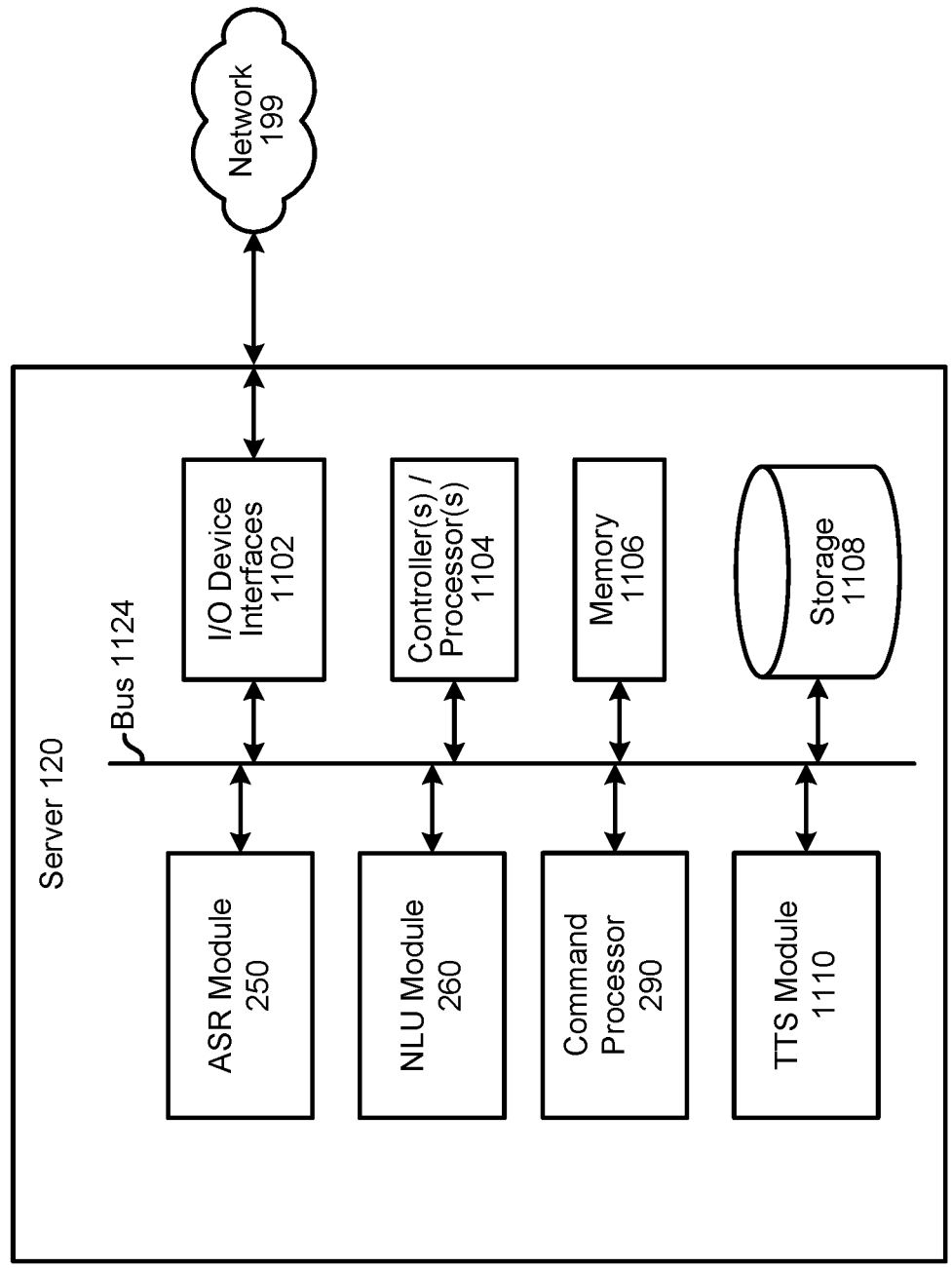
FIG. 11 is a block diagram conceptually illustrating example components of a server according to embodiments of the present disclosure.

FIG. 10 is a block diagram conceptually illustrating a local device 110 (for example devices 110*a* and 110*b* as herein described) that may be used with the described system. FIG. 11 is a block diagram conceptually illustrating example components of a remote device, such as a remote server 120 that may assist with ASR, NLU processing, or command processing. Multiple such servers 120 may be included in the system, such as one server(s) 120 for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1004/1104), that may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive (MRAM) and/or other types of memory. Each device may also include a data storage component (1008/1108), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces, as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to the device 110 of FIG. 10, the device 110 may include a display 1018, which may comprise a touch interface 1019 configured to receive limited touch inputs. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1002 that connect to a variety of components such as an audio output component such as a speaker 101, a wired headset or a wireless headset (not illustrated) or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 (using microphone 103, wakeword detection module 220, ASR module 250, etc.) may be configured to determine audio data corresponding to detected audio data. The device 110 (using input/output device interfaces 1002, antenna 1014, etc.) may also be configured to transmit the audio data to server 120 for further processing or to process the data using internal components such as a wakeword detection module 220.

For example, via the antenna(s) 1014, the input/output device interfaces 1002 may connect to one or more networks 11010 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1008 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1008 and compare the captured audio to the stored models and audio sequences using audio comparison, pattern recognition, keyword spotting, audio signature, and/or other audio processing techniques.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 10 and 11, are exemplary, and may be located as a stand-alone device or may be included, in whole or in part, as a component of a larger device or system.

To create output speech, the server 120 may be configured with a text-to-speech ("TTS") module 11101110 that transforms text data into audio data representing speech. The audio data may then be sent to the device 110 for playback to the user, thus creating the output speech. The TTS module 1110 may include a TTS storage for converting the input text into speech. The TTS module 1110 may include its own controller(s)/processor(s) and memory or may use the controller/processor and memory of the server(s) 120 or other device, for example. Similarly, the instructions for operating the TTS module 1110 may be located within the TTS module 1110, within the memory and/or storage of the server(s) 120, or within an external device.

Text input into a TTS module 1110 may be processed to perform text normalization, linguistic analysis, and linguistic prosody generation. During text normalization, the TTS module 1110 processes the text input and generates standard text, converting such things as numbers, abbreviations (such as Apt., St., etc.), and symbols ($, %, etc.) into the equivalent of written out words.

During linguistic analysis the TTS module 1110 analyzes the language in the normalized text to generate a sequence of phonetic units corresponding to the input text. This process may be referred to as phonetic transcription. Phonetic units include symbolic representations of sound units to be eventually combined and output by the system 100 as speech. Various sound units may be used for dividing text for purposes of speech synthesis. The TTS module 1110 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system 100, for example in the TTS storage. The linguistic analysis performed by the TTS module 1110 may also identify different grammatical components such as prefixes, suffixes, phrases, punctuation, syntactic boundaries, or the like. Such grammatical components may be used by the TTS module 1110 to craft a natural sounding audio waveform output. The language dictionary may also include letter-to-sound rules and other tools that may be used to pronounce previously unidentified words or letter combinations that may be encountered by the TTS module 1110. Generally, the more information included in the language dictionary, the higher quality the speech output.

Based on the linguistic analysis, the TTS module 1110 may then perform linguistic prosody generation where the phonetic units are annotated with desired prosodic characteristics, also called acoustic features, which indicate how the desired phonetic units are to be pronounced in the eventual output speech. During this stage the TTS module 1110 may consider and incorporate any prosodic annotations that accompanied the text input. Such acoustic features may include pitch, energy, duration, and the like. Application of acoustic features may be based on prosodic models available to the TTS module 1110. Such prosodic models indicate how specific phonetic units are to be pronounced in certain circumstances. A prosodic model may consider, for example, a phoneme's position in a syllable, a syllable's position in a word, a word's position in a sentence, phrase, or paragraph, neighboring phonetic units, etc. As with the language dictionary, prosodic models with more information may result in higher quality speech output than prosodic models with less information. As can be appreciated, when a larger portion of a textual work is made available to the TTS module 1110, the TTS module 1110 may assign more robust and complex prosodic characteristics that vary across the portion, thus making the portion sound more human, resulting in higher quality audio output.

The TTS module 1110 may generate a symbolic linguistic representation, which may include a sequence of phonetic units annotated with prosodic characteristics. This symbolic linguistic representation may then be converted into an audio waveform of speech for output to an audio output device (such as a microphone) and eventually to a user. The TTS module 1110 may be configured to convert the input text into high-quality natural-sounding speech in an efficient manner. Such high-quality speech may be configured to sound as much like a human speaker as possible, or may be configured to be understandable to a listener without attempts to mimic a specific human voice.

The TTS module 1110 may perform speech synthesis using one or more different methods. In one method of synthesis called unit selection, described further below, the TTS module 1110 matches the symbolic linguistic representation against a database of recorded speech, such as a database of a voice corpus. The TTS module 1110 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc. Using all the information in the unit database, the TTS module 1110 may match units (for example in a unit database) to the input text to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis, called parametric synthesis, parameters such as frequency, volume, and noise are varied by the TTS module 1110 to create an artificial speech waveform output. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS module 1110 may include an acoustic model, or other models, which may convert a symbolic linguistic representation into a synthetic acoustic waveform of the text input based on audio signal manipulation. The acoustic model includes rules that may be used to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation.

As illustrated in FIG. 12 multiple devices (120, 110, 110c-110f) may contain components of the system 100 and the devices may be connected over a network 199. Network 199 may include a local or private network or may include a wide network such as the Internet. Devices may be connected to the network 199 through either wired or wireless connections. For example, a speech controlled device 110, a tablet computer 110e, a smart phone 110c, a smart watch 110d, and/or a vehicle 110f may be connected to the network 199 through a wireless service provider, over a WiFi or cellular network connection or the like. Other devices are included as network-connected support devices, such as a server 120, application developer devices, or others. The support devices may connect to the network 199 through a wired connection or wireless connection. Networked devices 110 may capture audio using one-or-more built-in or connected microphones 103 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first input data corresponding to a user input;
   determining the first input data represents a request for an audio communication to be performed;
   determining, in the first input data, first information to be output by a first device;
   performing speech synthesis processing to determine first audio data corresponding to the first information;
   sending the first audio data to the first device;
   receiving, from the first device, second input data;
   processing the second input data to determine an action; and
   performing the action.

2. The computer-implemented method of claim 1, wherein the second input data comprises second audio data and the computer-implemented method further comprises:
   performing speech processing on the second audio data to determine the action.

3. The computer-implemented method of claim 1, wherein:
   processing the second input data to determine the action comprises processing the second input data to determine a command to allow a call involving the first device; and
   performing the action comprises causing the call to be connected between the first device and a second device corresponding to the user input.

4. The computer-implemented method of claim 1, wherein:
   processing the second input data to determine the action comprises processing the second input data to determine the request has been declined; and
   performing the action comprises sending, to a second device corresponding to the user input, output data representing the request has been declined.

5. The computer-implemented method of claim 1, wherein the second input data corresponds to a physical interaction performed with the first device.

6. The computer-implemented method of claim 1, wherein the first input data comprises second audio data and the computer-implemented method further comprises:
   performing speech processing on the second audio data to determine the first information.

7. The computer-implemented method of claim 1, wherein the first input data corresponds to first text data and the computer-implemented method further comprises:
   performing natural language understanding processing on the first text data to determine the first information.

8. The computer-implemented method of claim 7, further comprising:
   determining a portion of the first text data corresponds to an entity; and
   determining, using the entity, a device identifier corresponding to the first device.

9. The computer-implemented method of claim 1, wherein:
   processing the second input data to determine the action comprises processing the second input data to determine second information for a calendar processor associated with the user input; and
   performing the action comprises sending, to the calendar processor, the second information.

10. The computer-implemented method of claim 9, further comprising:
    performing speech synthesis processing to determine second audio data corresponding to the second information; and
    sending the second audio data to a second device associated with the user input.

11. A system, comprising:
at least one processor; and
at least one memory comprising instructions that, when executed by the at least one processor, cause the system to:
- receive first input data corresponding to a user input;
- determine the first input data represents a request for an audio communication to be performed;
- determine, in the first input data, first information to be output by a first device;
- perform speech synthesis processing to determine first audio data corresponding to the first information;
- send the first audio data to the first device;
- receive, from the first device, second input data;
- process the second input data to determine an action; and
- perform the action.

12. The system of claim 11, wherein the second input data comprises second audio data and wherein the at least one memory further comprises instructions that, when executed by the at least one processor, further cause the system to:
- perform speech processing on the second audio data to determine the action.

13. The system of claim 11, wherein:
- the instructions that cause the system to process the second input data to determine the action comprise instructions that, when executed by the at least one processor, cause the system to process the second input data to determine a command to allow a call involving the first device; and
- the instructions that cause the system to perform the action comprise instructions that, when executed by the at least one processor, cause the system to cause the call to be connected between the first device and a second device corresponding to the user input.

14. The system of claim 11, wherein:
- the instructions that cause the system to process the second input data to determine the action comprise instructions that, when executed by the at least one processor, cause the system to process the second input data to determine the request has been declined; and
- the instructions that cause the system to perform the action comprise instructions that, when executed by the at least one processor, cause the system to send, to a second device corresponding to the user input, output data representing the request has been declined.

15. The system of claim 11, wherein the second input data corresponds to a physical interaction performed with the first device.

16. The system of claim 11, wherein the first input data comprises second audio data and wherein the at least one memory further comprises instructions that, when executed by the at least one processor, further cause the system to:
- perform speech processing on the second audio data to determine the first information.

17. The system of claim 11, wherein the first input data corresponds to first text data and wherein the at least one memory further comprises instructions that, when executed by the at least one processor, further cause the system to:
- perform natural language understanding processing on the first text data to determine the first information.

18. The system of claim 17, wherein the at least one memory further comprises instructions that, when executed by the at least one processor, further cause the system to:
- determine a portion of the first text data corresponds to an entity; and
- determine, using the entity, a device identifier corresponding to the first device.

19. The system of claim 11, wherein:
- the instructions that cause the system to process the second input data to determine the action comprise instructions that, when executed by the at least one processor, cause the system to process the second input data to determine second information for a calendar processor associated with the user input; and
- the instructions that cause the system to perform the action comprise instructions that, when executed by the at least one processor, cause the system to send, to the calendar processor, the second information.

20. The system of claim 19, wherein the at least one memory further comprises instructions that, when executed by the at least one processor, further cause the system to:
- perform speech synthesis processing to determine second audio data corresponding to the second information; and
- send the second audio data to a second device associated with the user input.

* * * * *